(12) United States Patent
Nash

(10) Patent No.: US 11,381,134 B2
(45) Date of Patent: *Jul. 5, 2022

(54) SUB-TERRANEAN UPDRAFT TOWER (STUT) POWER GENERATOR

(71) Applicant: POWERSILO INC., Novato, CA (US)

(72) Inventor: Rod Nash, Novato, CA (US)

(73) Assignee: PowerSILO Inc., Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,474

(22) Filed: Dec. 7, 2020

(65) Prior Publication Data

US 2021/0091634 A1 Mar. 25, 2021

Related U.S. Application Data

(63) Continuation-in-part of application No. 14/706,845, filed on May 7, 2015, now Pat. No. 10,859,066.
(Continued)

(51) Int. Cl.
*H02K 7/18* (2006.01)
*F03D 3/00* (2006.01)

(52) U.S. Cl.
CPC ............ *H02K 7/183* (2013.01); *F03D 3/005* (2013.01); *F05B 2230/60* (2013.01)

(58) Field of Classification Search
CPC ...... H02K 7/183; F03D 3/005; F05B 2230/60
See application file for complete search history.

(56) References Cited

U.S. PATENT DOCUMENTS 3,927,659 A 12/1975 Blake et al.
3,976,508 A 8/1976 Mlavsky
(Continued)

OTHER PUBLICATIONS

International Search Report (3 pages, Form PCT/ISA/210) issued in PCT/US2021/057465 (Same Patent Family as Present Application), Issued by ISA (KIPO) dated Feb. 28, 2022, Daejoen, Republic of Korea. Note: All references cited therein or their equivalents are already of record in the present application.
(Continued)

*Primary Examiner* — Sean Gugger
(74) *Attorney, Agent, or Firm* — Silver Legal LLC; Jarrett L. Silver

(57) ABSTRACT

A Sub-Terrestrial Updraft Tower (STUT), combination sub-surface Downdraft/Updraft Tower, comprising an Inner Updraft Shaft and Outer Downdraft Shaft, housing the Inner Updraft Shaft, receiving air flow from air-inlets at surface level into Outer Downdraft Shaft. Upon reaching the bottom of the Outer Downdraft Shaft, air flow reverses In direction, inward and upward, into the Inner Updraft Shaft. Volumetric Displacement or airflow is induced and sustained via the injection of air and heat into the Downdraft/Updraft respectively; driving a plurality of sustained system pressure biases, and fed by temperature differentials that are initiated, sustained, and enhanced due to the configuration, orientations and functions of numerous STUT elements including partitions, thermal barrier coatings, air intake and cowlings; creating coherent, accelerated airflow to pass through/within a ringed shaped, diverging converging Vertical Axis Vertical Airflow Nozzle and Turbine (VAVANT); airflow causes rotation of VAVANT, and summation of torque forces at VAVANT hub, shaft, gearbox, and power head, generate EMF, and electrical power.

32 Claims, 15 Drawing Sheets

Related U.S. Application Data

(60) Provisional application No. 61/989,730, filed on May 7, 2014.

(56) References Cited

U.S. PATENT DOCUMENTS

| | | |
|---|---|---|
| 4,044,753 A | 8/1977 | Fletcher |
| 4,121,566 A | 10/1978 | Radenkovic |
| 4,137,899 A | 2/1979 | Weslow |
| 4,146,789 A | 3/1979 | Nakai |
| 4,209,007 A | 6/1980 | Collins |
| D288,593 S | 3/1987 | Campbell |
| D311,516 S | 10/1990 | Geisler, Jr. |
| D425,013 S | 5/2000 | Lai |
| 6,363,928 B1 | 4/2002 | Anderson, Jr. |
| 6,384,320 B1 | 5/2002 | Chen |
| 6,717,045 B2 | 4/2004 | Chen |
| D543,500 S | 5/2007 | Parness et al. |
| 7,798,684 B2 | 9/2010 | Boissevain |
| 8,207,625 B1 | 6/2012 | Cristo |
| 9,404,392 B2 | 8/2016 | Kare et al. |
| 10,859,066 B2 * | 12/2020 | Nash .................... F03D 9/35 |
| 2006/0156725 A1 | 7/2006 | Kenessey |
| 2011/0074164 A1 | 3/2011 | Kobayashi |
| 2013/0001951 A1 | 1/2013 | Tai et al. |
| 2013/0038068 A1 | 2/2013 | Tai et al. |
| 2013/0168965 A1 | 7/2013 | Yocum, Jr. |
| 2014/0174086 A1 | 6/2014 | Kare et al. |
| 2015/0337676 A1 | 11/2015 | Feng et al. |
| 2016/0186615 A1 * | 6/2016 | Kare .................... F01K 11/00 290/52 |
| 2016/0186725 A1 * | 6/2016 | Dofredo .................. F03D 9/007 60/641.12 |
| 2016/0298612 A1 | 10/2016 | Bohl |
| 2016/0333748 A1 | 11/2016 | Rudowicz et al. |
| 2017/0051717 A1 | 2/2017 | Kim |
| 2019/0316563 A1 | 10/2019 | Hyseni |

OTHER PUBLICATIONS

Written Opinion (6 pages, Form PCT/ISA/237) issued in PCT/US2021/057465 (Same Patent Family as Present Application), Issued by ISA (KIPO) dated Feb. 28, 2022, Daejoen, Republic of Korea. Note: All references cited therein or their equivalents are already of record in the present application.

* cited by examiner

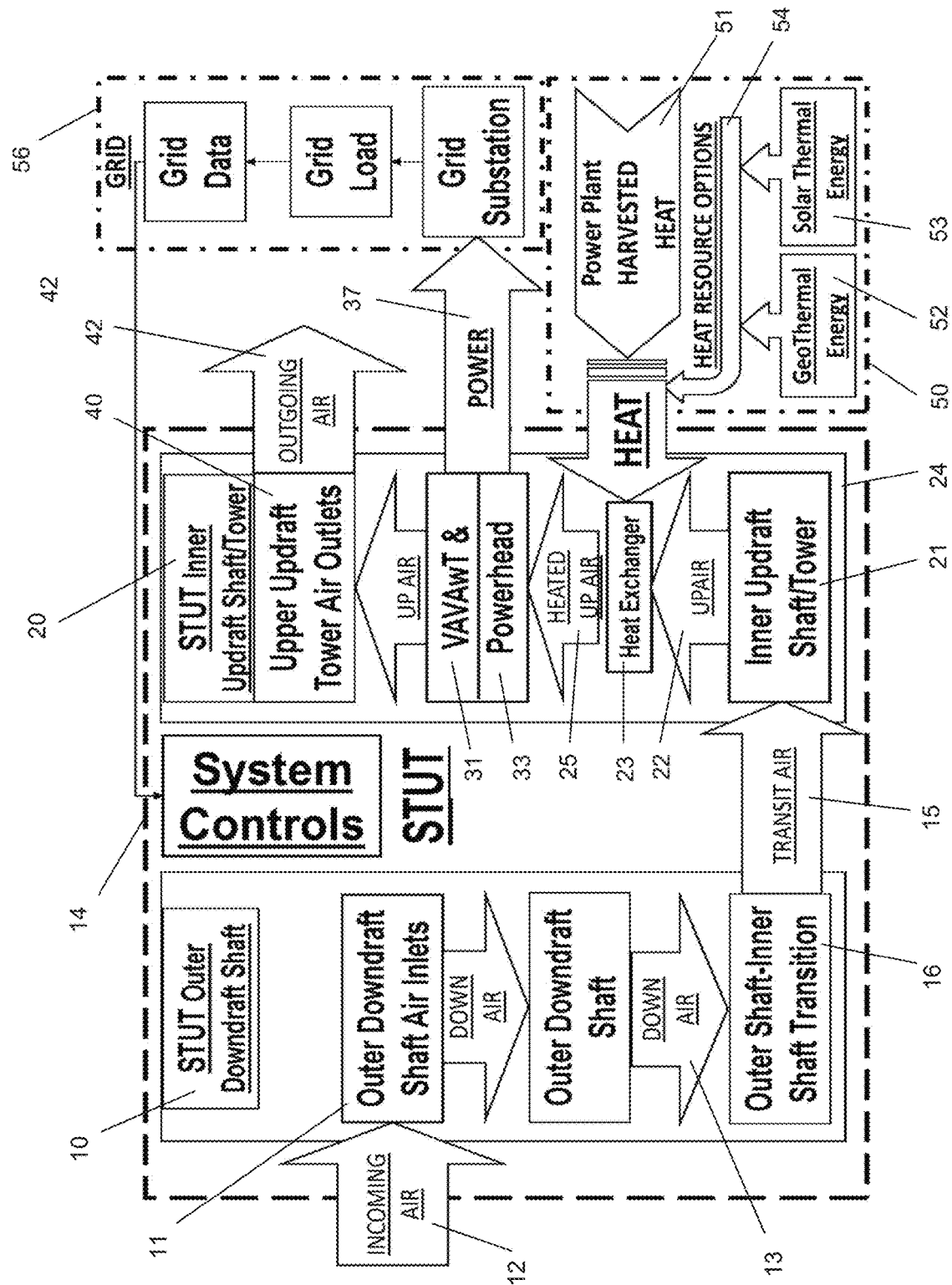
Figure 1 - STUT Functional Diagram

Figure 2 – STUT Process Relative Conditions Not.To.Scale (N.T.S.) or Proportion.
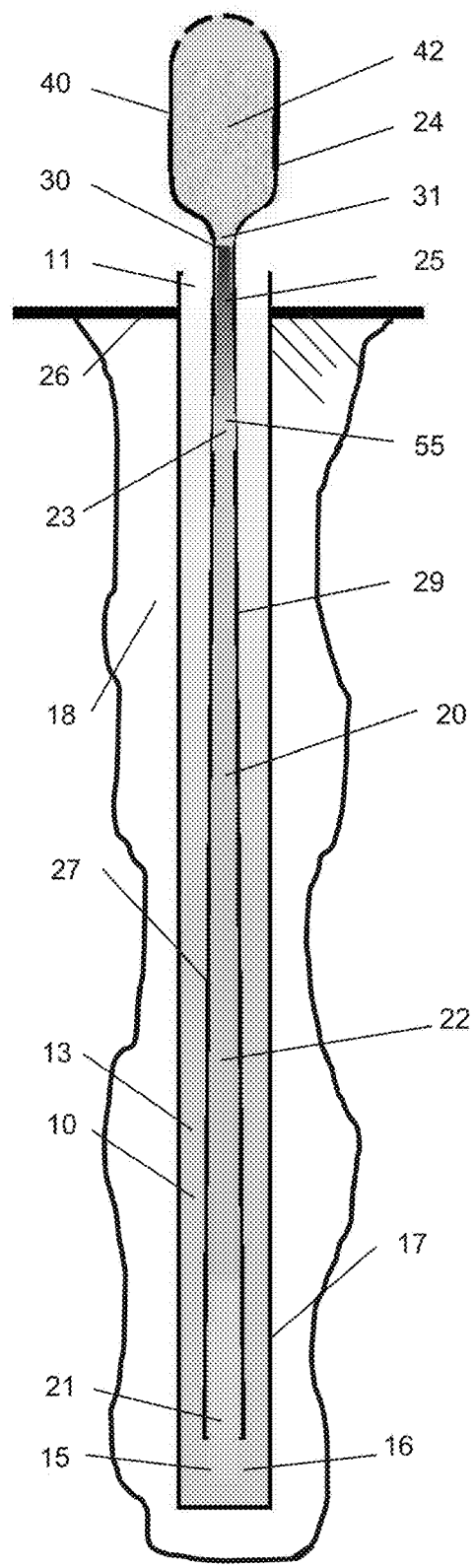
Figure 3 – Axonometric View (N.T.S.) or Proportion.
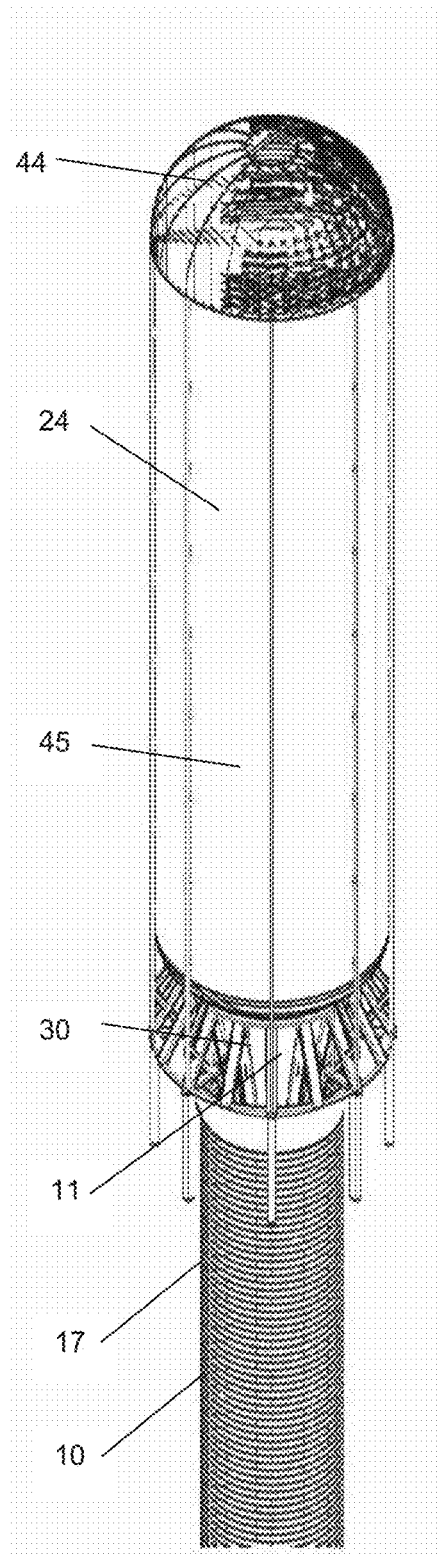
Copyright 2015, Rodney Nash, All Rights Reserved Figure 4 – Full System View Longitudinal Section - (N.T.S.) or Proportion.
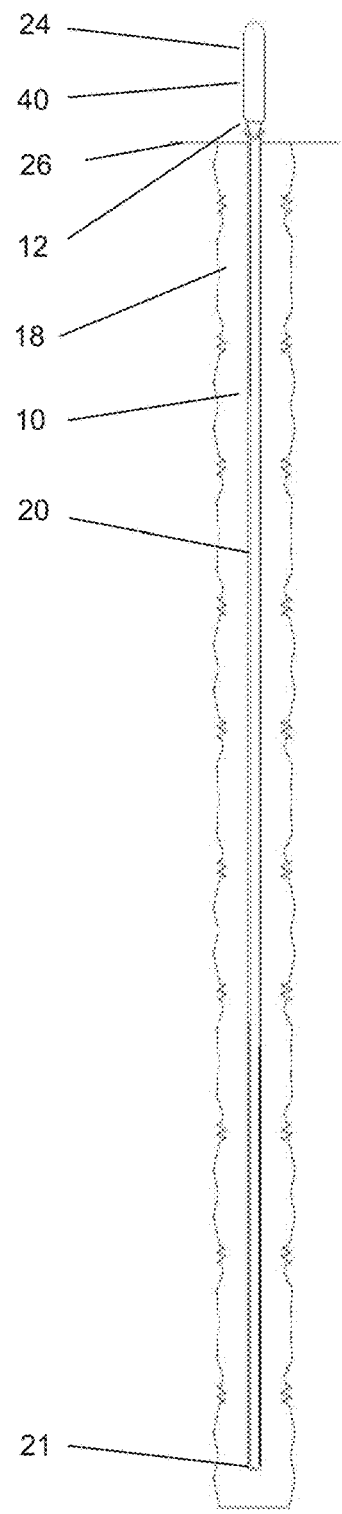

Figure 5 – Elevation – (N.T.S.) or Proportion.
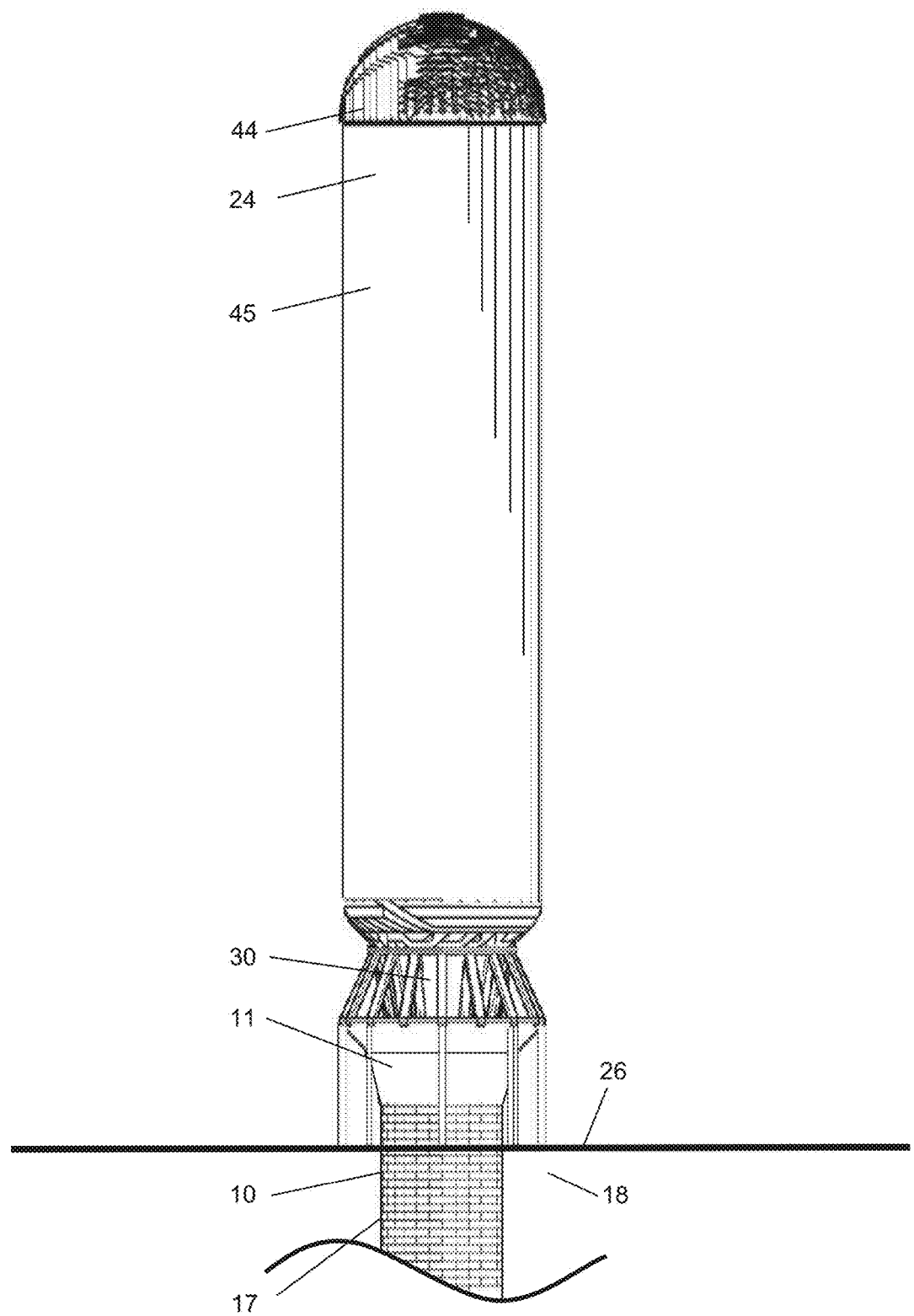
Copyright 2015, Rodney Nash, All Rights Reserved Figure 6 - Top View - (N.T.S.) or Proportion.
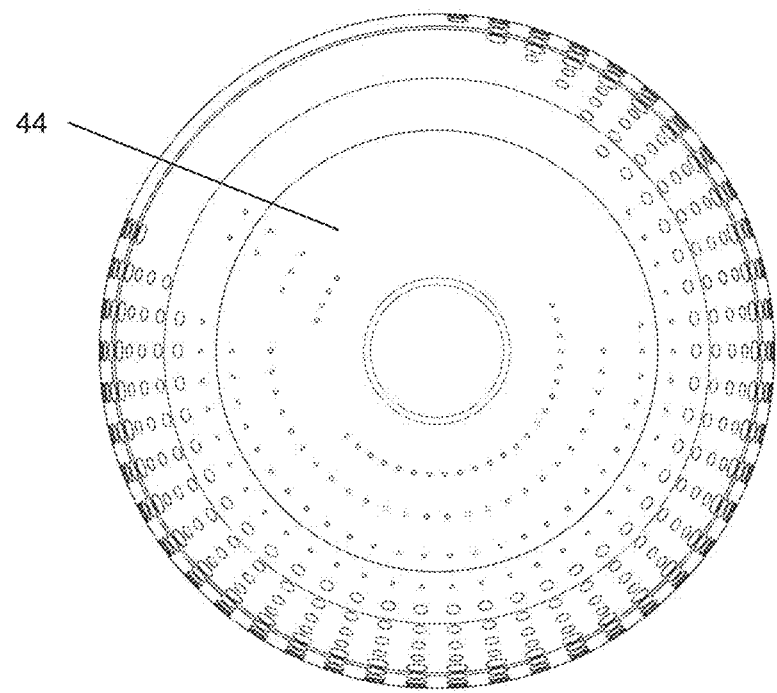

Figure 7 – Longitudinal Section - (N.T.S.) or Proportion.
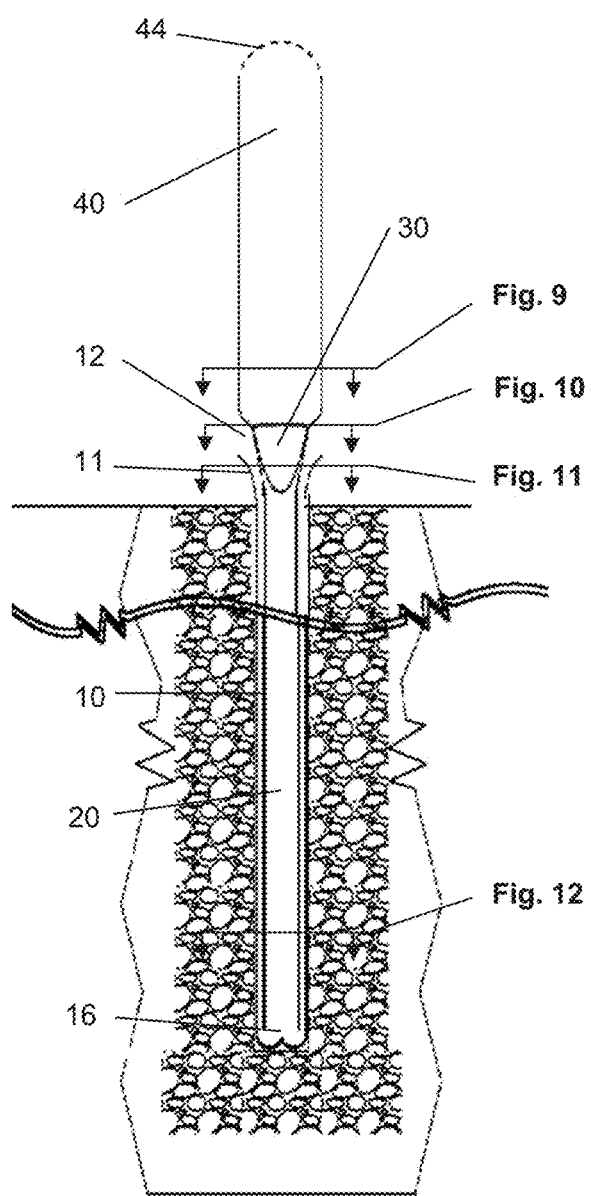

Figure 8 – Enlarged Latitudinal Section – Upper Shaft - (N. T.S.) or Proportion.
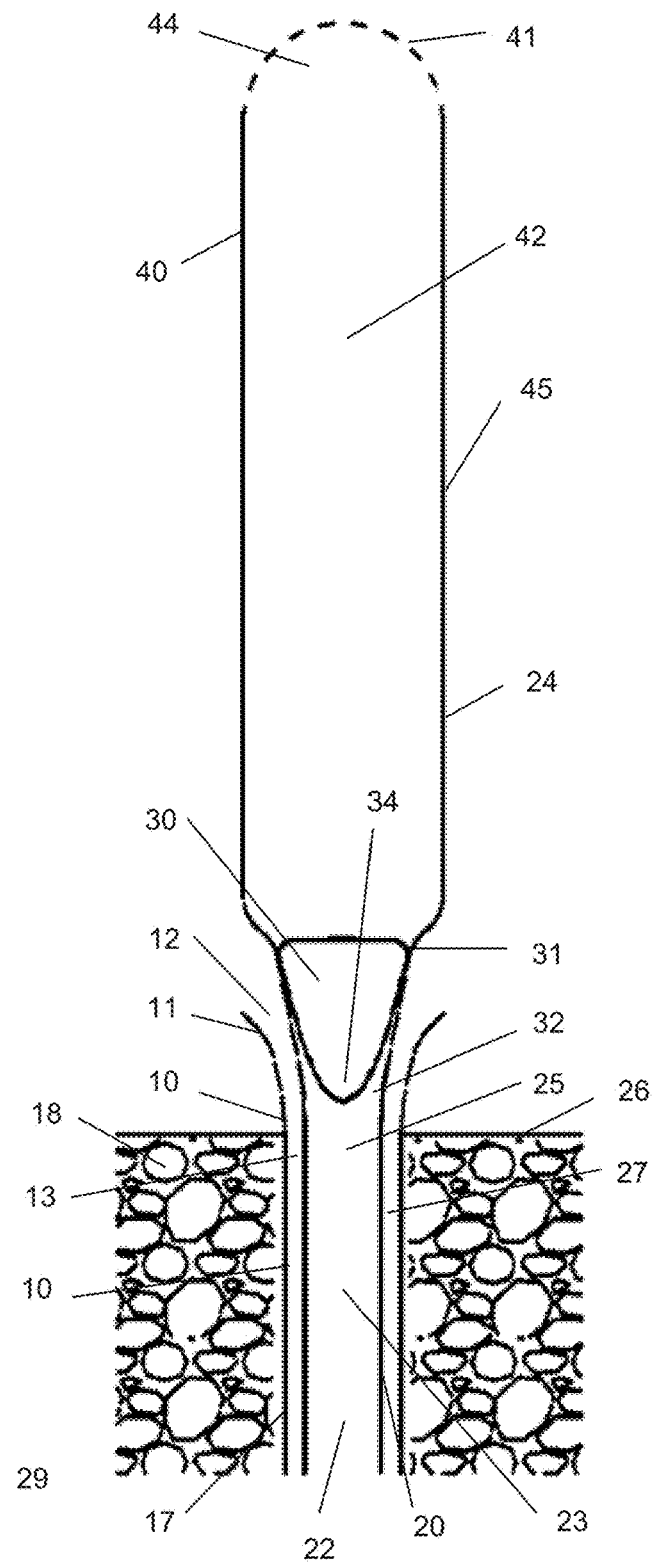

Figure 9 – Enlarged Latitudinal Section – Upper Shaft - (N.T.S.) or Proportion.
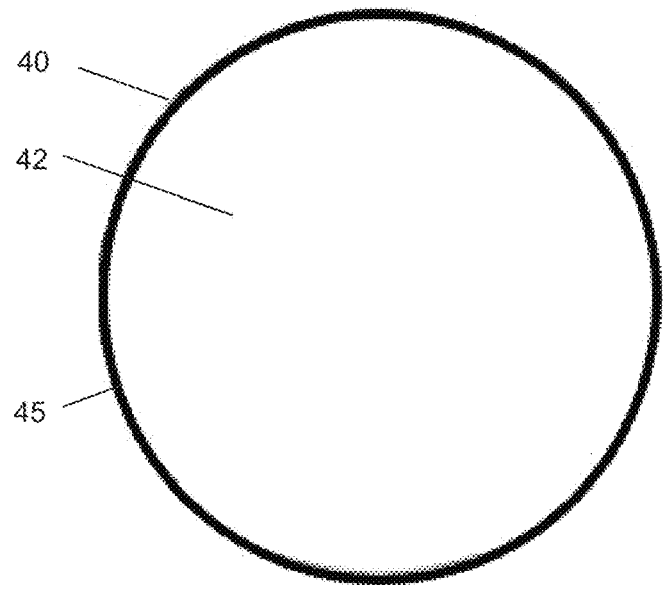
Figure 10 - Latitudinal Section - Nozzle & VAVANT - (N.T.S.) or Proportion.
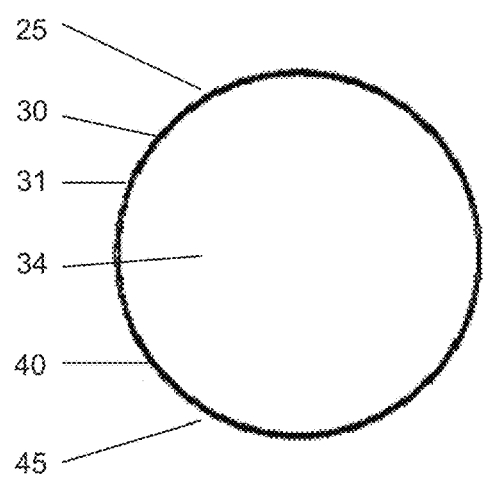

Figure 11 – Latitudinal Section – Downdraft Air Intake & Inner Updraft Shaft 20 w/Nozzle – (N.T.S.) or Proportion.
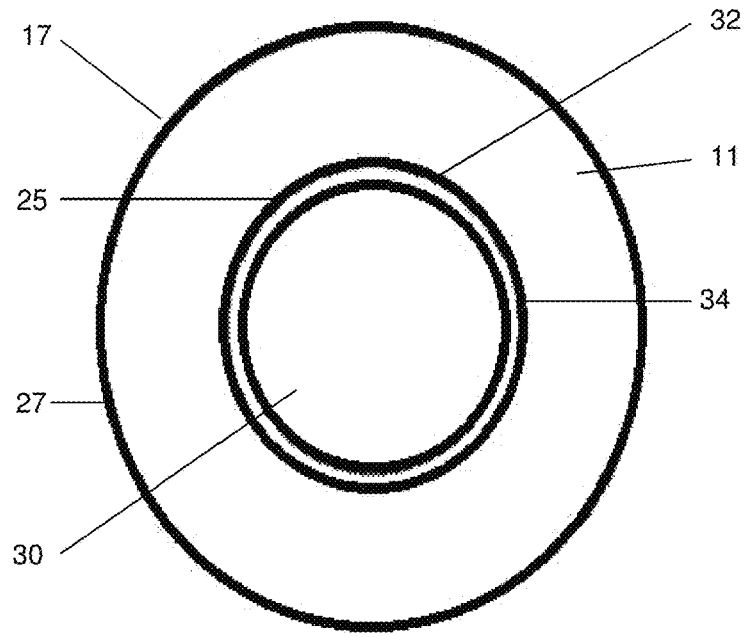
Figure 12 – Latitudinal Section – Downdraft/Updraft shaft 20- (N.T.S.) or Proportion.
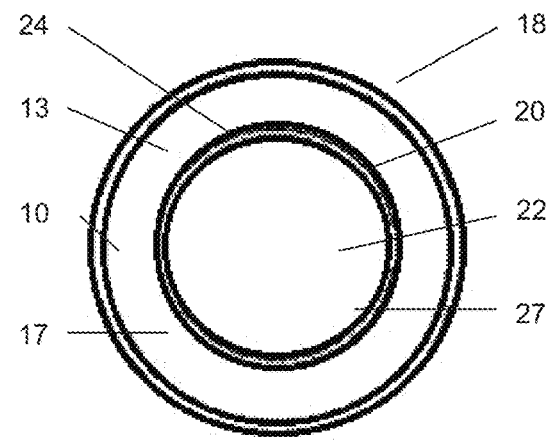

Figure 13 - Longitudinal Axonometric Section - (N.T.S.) or Proportion.
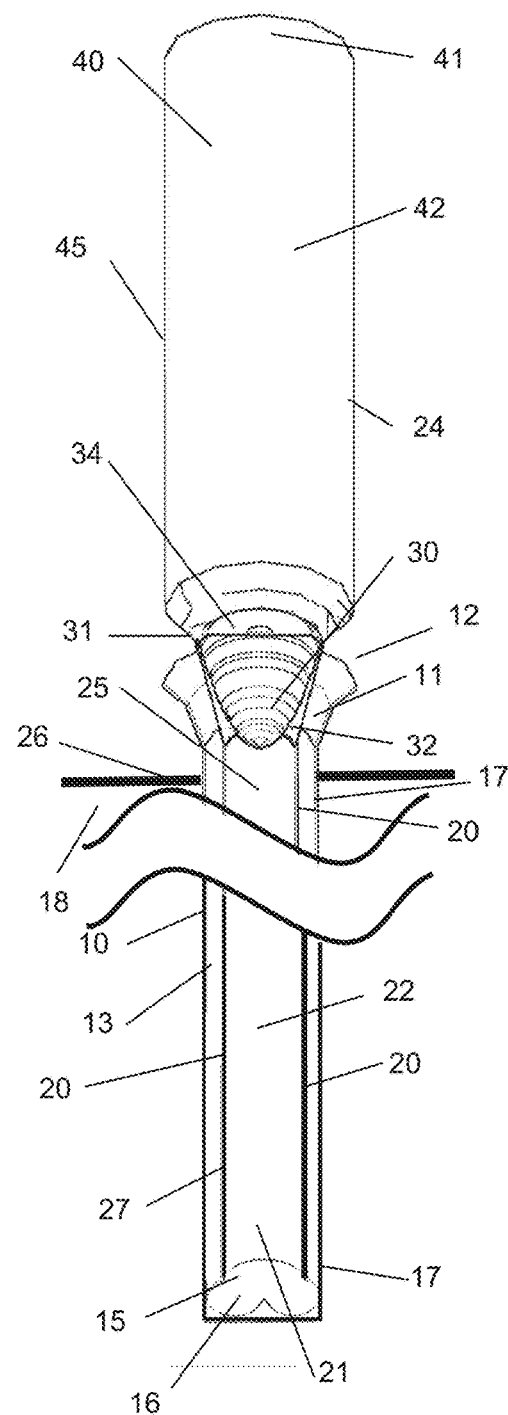

Figure 14 - Axonometric Section of STUT Center Rippled Effect Paraboloid Shaped Cowling Transition Zone
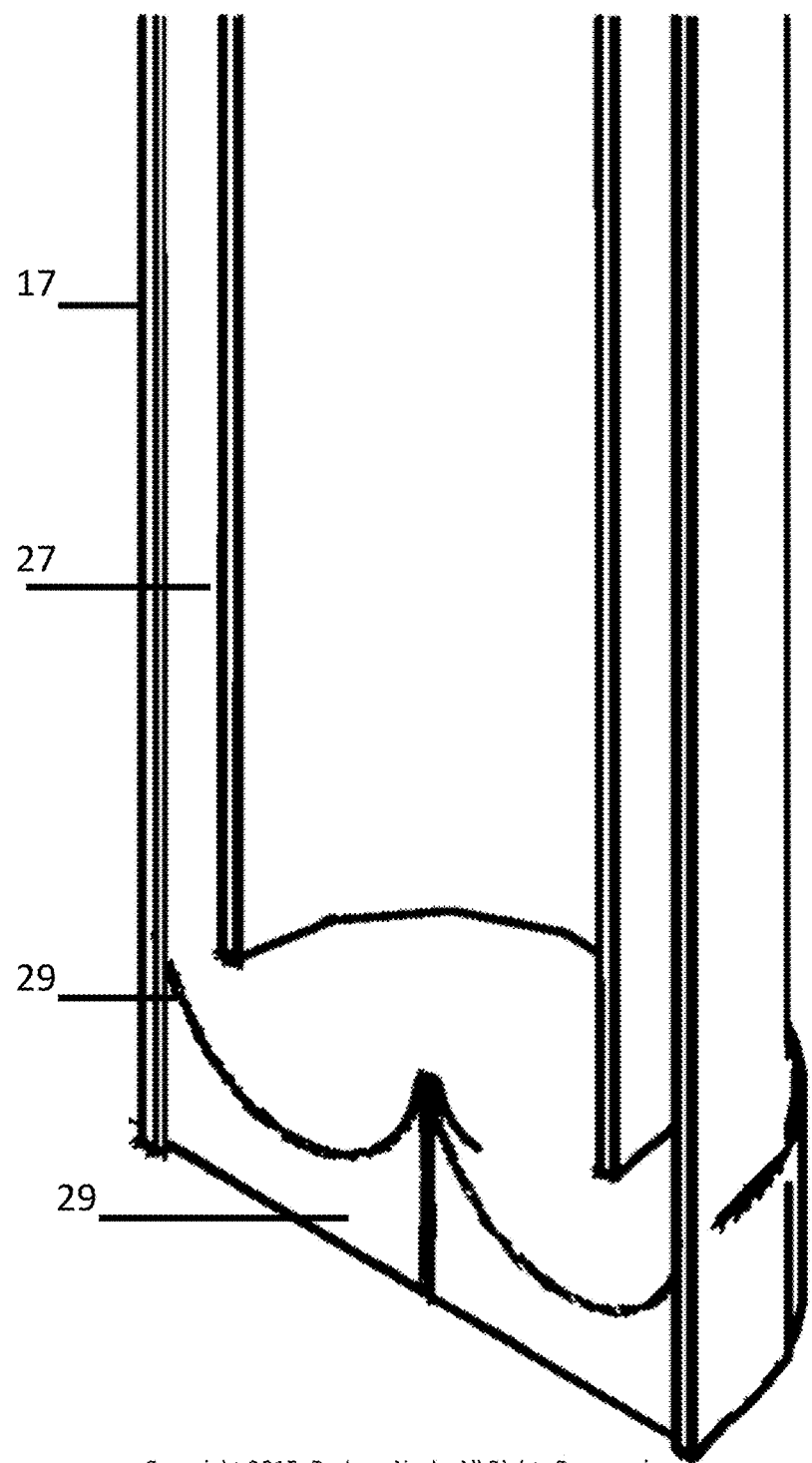

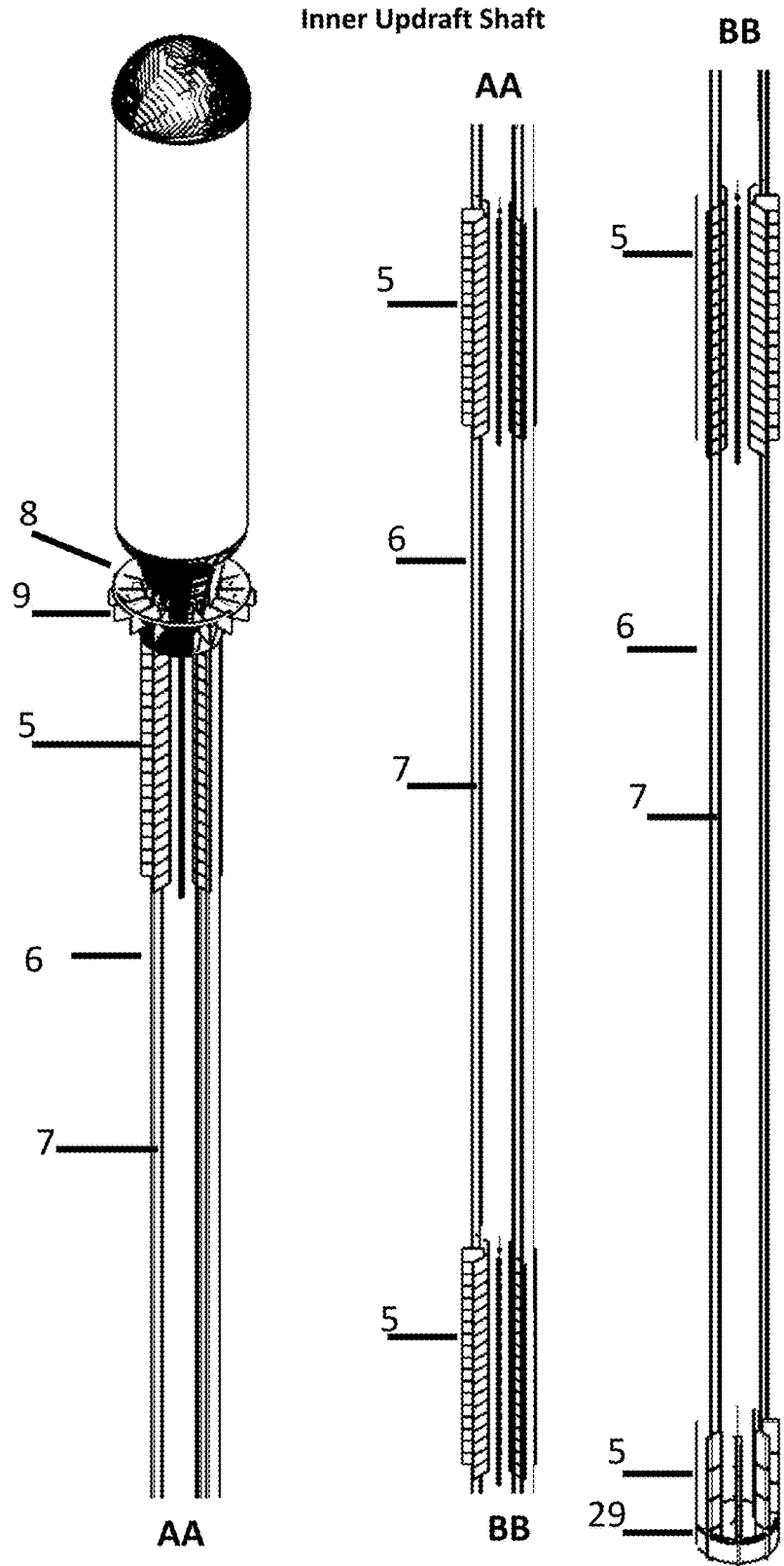
Figure 15- Axonometric Section of STUT Upper Updraft Tower, Outer Down-Draft Shaft, and Inner Updraft Shaft Figure 16 - Axonometric of STUT Upper Updraft Tower & Outer Down-Draft Shaft Intake Ducting/Partitions
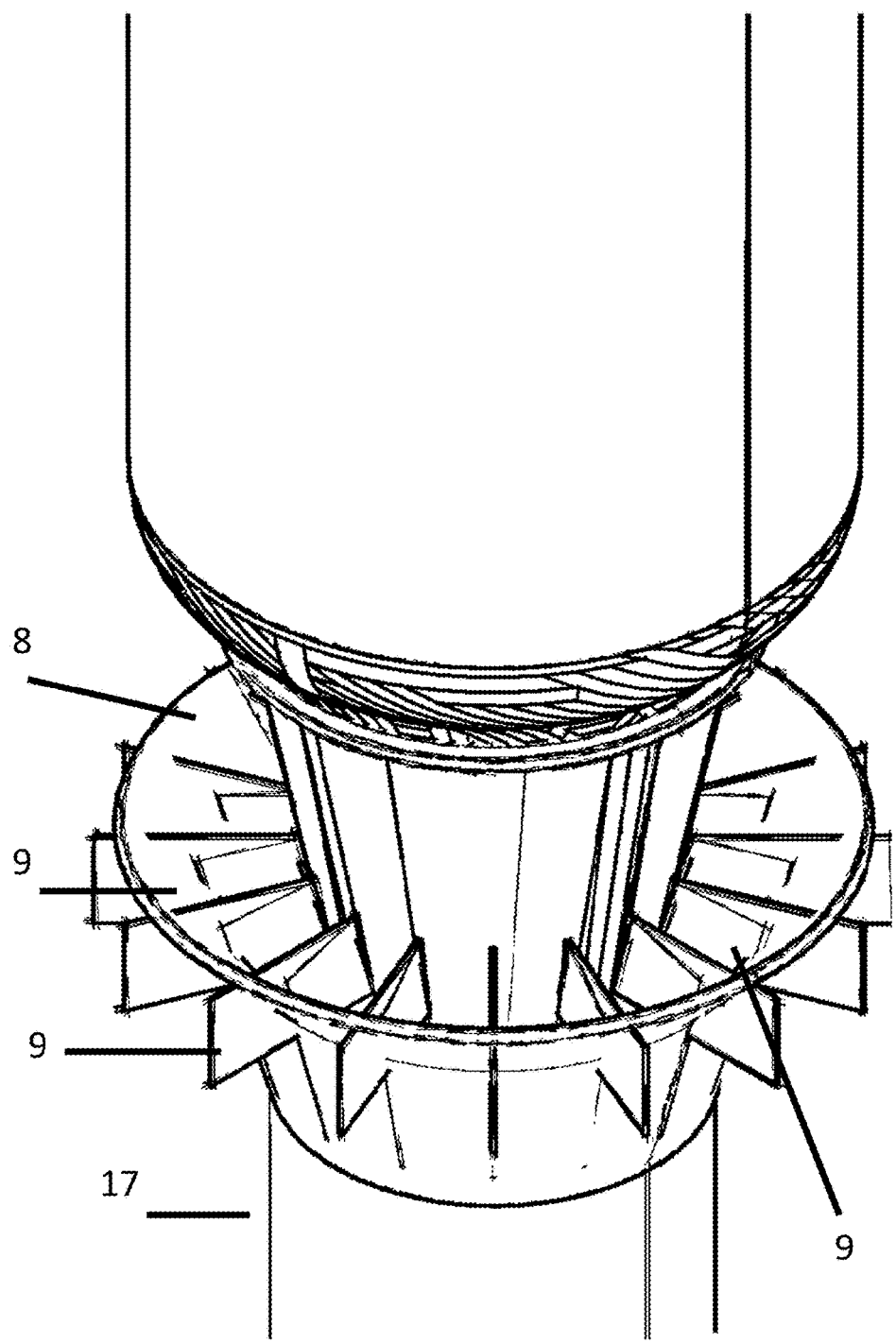

Figure 17 - Axonometric Section of STUT Center Rippled Effect Paraboloid Shaped Cowling Transition Zone
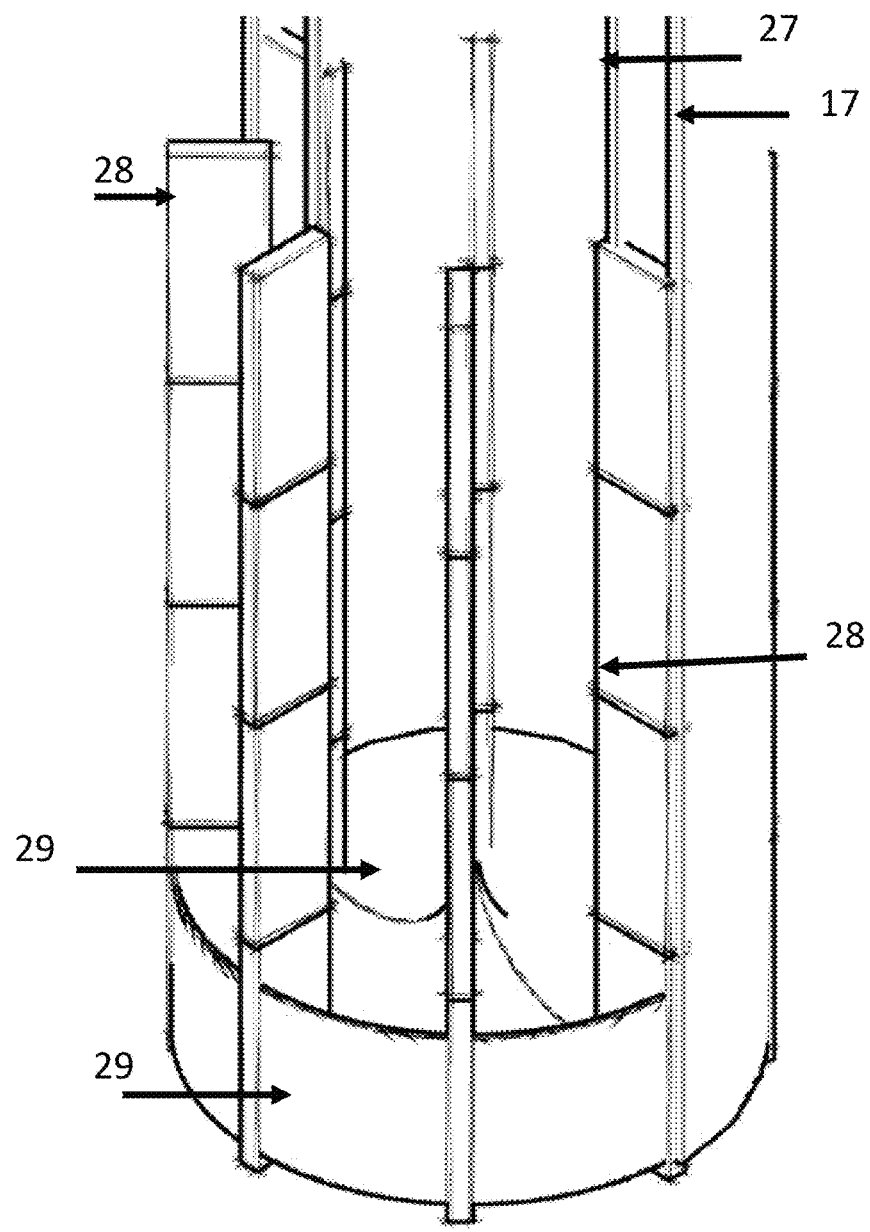

Figure 18- Axonometric Section of STUT Outer Down-Draft Shaft and Inner Updraft Shaft Partitioning
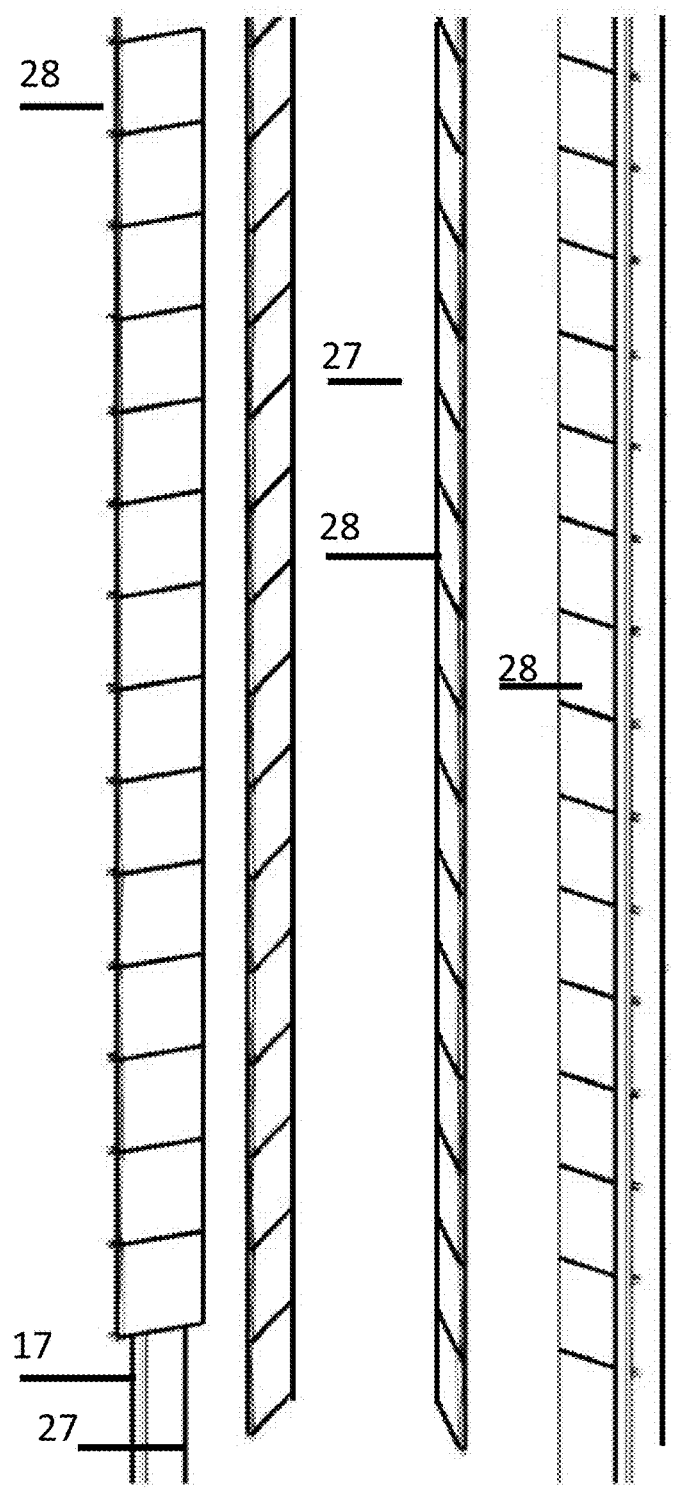

SUB-TERRANEAN UPDRAFT TOWER (STUT) POWER GENERATOR

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE OF RELATED APPLICATION

This application is a continuation-in-part of U.S. patent application Ser. No. 14/706,845, filed on May 7, 2015, which claims the benefit of U.S. Provisional Patent Application Ser. No. 61/989,730 filed on May 7, 2014. This application claims priority to and incorporates by reference these applications in their entirety. If any conflict arises between the disclosure of the invention in this utility application and those in the prior applications, the disclosure in this utility application shall govern.

FIELD OF THE INVENTION

The invention generally relates to subterranean tower power generator systems. More particularly, the invention relates to means and methods of incorporating the combination of updraft and downdraft shafts while utilizing the Energy Harvesting of thermoelectric power plants, geothermal, and solar thermal energy.

DESCRIPTION OF THE RELATED ART

| | | |
|---|---|---|
| 3,927,659 | December 1975 | Blake et al. |
| 3,976,508 | November 1978 | Mlavsky |
| 4,044,753 | August 1977 | Fletcher |
| 4,121,566 | October 1978 | Radenkovic |
| 4,137,899 | February 1979 | Weslow |
| 4,146,789 | March 1979 | Nakai |
| 4,209,007 | June 1980 | Collins |
| D288593 | March 1987 | Campbell |
| D311516 | October 1990 | Geisler, Jr. |
| D425013 | May 2000 | Lai |
| 6,363,928 | April 2002 | Anderson, Jr. |
| 6,384,320 | May 2002 | Chen |
| 6,717,045 | April 2004 | Chen |
| D543500 | May 2007 | Parness et al. |

BACKGROUND OF THE INVENTION

Traditional fossil fuel electrical power generation is inefficient, not sustainable, and based on finite, nonrenewable fuel supplies that, due to the chemical process used to render heat from these fuels, produce pollution and are harmful to the human environment. Power utility systems require the installation and maintenance of vast fuel supply, transmission, and distribution infrastructure. Because of the fundamental hierarchy and organization of the existing power generation and transmission systems, i.e., centrally located electrical resources and multiple, remotely located users or loads, changes or modifications to the system are too expensive, and cost prohibitive for the integration and eventual conversion of existing fossil fuel power infrastructure, toward classical unreliable, renewable, distributed generation technologies.

Traditional fossil fuel electrical power generation assets remain in operation, and are increasing in actual total power generation, due to the unreliable nature and increased deployment of classic (i.e., wind and solar) renewable power. The designers of this existing generation and distribution system did not anticipate the quantity and scale of growth and changes that would stress this system, threatening to make it outdated and possibly obsolete.

Renewable power resources in distributed, or decentralized generation development, are challenged by technical, regulatory, political, social, environmental, and economic factors. These and other development considerations will continue to make the adoption and deployment of classic renewable energy technology less successful because of the quality and characteristics of their adaptability, accessibility, availability, reliability, affordability, and applicability. Increasing the total generation capacity of existing power utility infrastructure by increasing the overall efficiency of traditional power generation systems; and transforming the quality and sustainability of that generation by reducing the pollution emission produced based on sustainable resources, with a power technology that enables a hybrid power generation retrofit of those existing power infrastructure assets (from a controllable, renewable emission free generation process), is a benefit.

Within the electrical power generation industry segment of alternative power generation, Solar Tower & Solar Updraft Tower ("SUT") have been considered as potential options for renewable power generation but have several development hurdles to overcome.

The classic SUT is an extremely tall tower and if built would be one of the tallest and largest structures on Earth. Existing Updraft Tower technology in the form of Solar Tower-ST, SUT, and Down Draft Towers ("DDT"), are in development and propose to provide emission-free utility-scale power. However, these Solar Tower-ST, Solar Updraft Tower-SUT systems remain dependent on the solar thermal gain to drive system temperature and pressure differentials, or in the case of Down Draft Towers, need large amounts of water, and large land mass resources.

An analysis of the adaptability, accessibility, applicability, and affordability concerns of these technologies lead to limited development potentials of these applications due to their size factors and technical, regulatory, political, social, environmental, and economic challenges. These given circumstances mean that though emission free, these platforms depend on climate, weather, and sun cycles to perform optimally.

The known art related to solar updraft towers, downdraft towers, and the classic renewables of Solar and Wind Power for power generation, does not integrate with existing power generation infrastructure; such as an option for dry cooling, or the utilization of Energy Harvesting to provide hybridization retrofit configuration options. This means that the path to a full zero emission industry solution offered by wind and solar, requires a total replacement of (not integration with) the existing generation technology, and associated infrastructure, to achieve 100% zero emissions within the electrical power generation industry. Due to the very low-capacity factors of classic wind and solar technology, a very large critical mass of wind and solar will need to be developed and installed, prior to turning off existing traditional fuel power plants. Existing classic renewables fail to provide a practical, reliable, and predictable means of controlling clean energy resources to generate reliable, base-load electrical emissions-free power.

A review of the technical performance and functions of the classic Utility Scale Solar Power reveals severe limitations to address base-load generation operations, and will need a potential storage option to address this operation deficiency; based on its need for daily access to the solar energy. A review of the technical performance and functions of the classic Utility Scale Horizontal Axis Wind Turbine (HAWT) reveals some fundamental differences in its performance profile, and the performance profile of ST/SUT updraft towers. HAWT Power Technology uses large diameter rotors blades to harness organic wind energy. HAWT are designed to work across a wide range of air velocities. Within the HAWT System, the largest amount or volume of wind energy to power conversion occurs in the outer +/−20% radius of rotor length; the tip, not hub, root, & span swept area, due to the cross-sectional area of this region. This outer cross-sectional area performance ring is approximately 40% of the HAWT Swept Area. HAWT lift is in direction of rotation (nearly perpendicular to airflow) to turn hub/shaft, gearbox, and powerhead. HAWTs depend on organic airflow, which varies with and depend on weather, seasons, geography, etc. HAWT Wind Farms use large land mass thus, is not adaptable, and has negative impacts on environment and human inhabitants. HAWT operates at with approximately 30-40% capacity factor, and thus is unreliable, not controllable, and not applicable for base-load power generation operations. An analysis of HAWT Technology potential viability, and feasibility reveals that there are not enough locations of potentially developable locations for wind power to solve existing power needs or future load growth.

ST/SUT Power Technology uses solar thermal gain from a large diameter ground-based collector/canopy, and a turbine or group of turbines at the base of the tower, to harness solar radiation, to create airflow and harness wind energy. ST/SUT creates a higher temp buoyant air mass under the canopy; and a relatively higher-pressure air mass near the center of the canopy. ST/SUT uses a pressure differential between surface & high altitude at the top of the tower, driven by thermal gain. The air mass of relatively higher pressure moves into the low-pressure zone within the tower. The turbine is at the base of the tower and center of the canopy; the system airflow choke point. Warm airflow moving through the choke point turns the turbine/s, gearbox, etc., thus producing electrical power. ST/SUT can produce baseload power, and is a very large system, requiring a vast land mass. Also, it is very tall, which makes it very expensive to build and operate. Analysis of the ST/SUT platform performance reveals that while being applicable, it also possesses accessibility, adaptability, and affordability deficiencies.

A power generation technology that provides a solution that resolves these issues identified, and other outstanding concerns here, would have significant positive national security, and national and international economic implications. Water & energy are integral for national, economic & environmental security. The existing technologies are 100% dependent on the organic means of sun and wind, and are thus unreliable and uncontrollable. The current technology requires the placement of wind turbines where the wind resource is most abundant. However there is a significant limitation on the energy density and adaptability of this technology. And large solar farms and the largest wind turbines technology are not conducive to installation near urban areas where renewable power is needed. Cities are usually not in the location where the generated electricity is needed. Often the wind power resources that are most available or accessible, and reliable are in very remote areas, i.e. open ocean; which requires additional capital expenditures on infrastructure development, which increases the development and operation costs of the wind resource.

A Power Plant Hybrid configuration is the most reliable, incremental, feasible option for establishing and maintaining energy independence; and as a resource pathway for the stable, responsible electrical power generation industry transition away from fossil fuels, within the relatively short window of time desired by most energy plans, environmental strategies, and regulations scheme. Described herein is an economical and feasible alternative to existing classic renewable technologies and traditional fossil fuel power generation. The need to develop and maintain a native electrical power generation resource that is unlimited, widely and readily available, economical, affordable, base-load capable, applicable, highly reliable, safe, clean, sustainable, controllable, accessible, is a benefit.

SUMMARY OF THE INVENTION

The example process (or processes) makes Sub-Terrestrial Updraft Tower-STUT a utility scale emissions free, base-load energy harvesting power generation technology that is:
  a. Available—Because it is Predictable, Forecastable, Reliable
  b. Accessible—Controllable, High Capacity Factor
  c. Affordable—Simple Design, Material, & Durable Construction
  d. Applicable—Emission Free, Base Load Capable, Renewable, Adaptable STUT Power Generation uses Energy Harvesting of a thermoelectric power plant to create a Hybrid Power Plant, that produces electrical power from a traditional fuel-based Rankine Cycle Process, and also from its recycled waste heat, not exhaust heat. STUT dramatically increases the overall power plant's efficiency and reduces pollution emissions of the thermoelectric power plant. Power generation is achieved with other Ubiquitous Renewable Heat Sources such as Geothermal Hot Dry Rock or Solar Thermal Gain in a stand-alone configuration. The controlled and enhanced flow of air into a downdraft shaft, with the airflow enhancements of the STUT inner updraft tower along with the injection of heat, along with the nozzled turbine and other unstated innovations; all combine to make the STUT a unique power generation technology that solves all previous technical problems identified with classic renewable technologies. These benefits are achieved while also serving as the first of its kind, viable baseload, zero emissions solution for existing fossil fuel power generation infrastructure; enabling hybrid power generation, and the power industry's transition toward zero emission power generation.

And STUT conserves water in thermoelectric power plants; reductions in fuel consumption, fuel costs, & associated pollution emissions by increases overall energy efficiency based on STUT Power Plant Hybridization Configuration. STUT provides dry cooling on a retrofit & new construction basis by recycling or energy harvesting thermoelectric power plant condensation loop heat, not exhaust heat, to create & sustain vertical air flow within a deep double walled subterranean updraft shaft/tower, across a Vertical Airflow, Vertical Axis Turbine; producing power & reducing the use of water for thermoelectric cooling.

Some embodiments include a unique, combination Downdraft/Updraft Tower process that generates electrical power from the volumetric displacements of air or other gases; driven by a plurality of sustained system pressure biases, and fed by temperature differentials initiated, sustained, and enhanced due to the configuration and orientations of the functions of numerous STUT process elements. The STUT process includes an Inner Updraft Shaft vertical air shaft with nested Vertical Axis Vertical Airflow Nozzle and Turbine, a unique VAVANT Airflow Turbine Assembly. The Inner Updraft Shaft is oriented and housed within a deep, sub-terrestrial Outer Downdraft Shaft which receives low-velocity air flow from outer air-inlets located at or near ground surface level; with airflow downward into a deep Outer Downdraft Shaft.

Once reaching the bottom of the Outer Downdraft Shaft, air flow reverses in direction, inward and upward, into the inlet of the Inner Updraft Shaft of the STUT. The STUT airflow is induced and sustained via the injection of air into the Outer Downdraft Shaft, and heat into the contoured Inner Updraft Shaft of the STUT, which creates a coherent and accelerated airflow; and approaches the contoured Vertical Axis Vertical Airflow Nozzle and Turbine—VAVANT Airflow Turbine with relatively increased pressure and velocity; causing divergent-convergent airflow to pass through and within the contoured nozzle, and across the VAVANT Airflow Turbine with high velocity and mass flow rate. The accelerated airflow causes rotation of the VAVANT Airflow Turbine, and the summation of torque forces present at the VAVANT Airflow Turbine hub and perimeter, attached gearing, and power head, thus generating EMF and electrical power. Gathering, collecting, controlling, aligning, orienting, conditioning, accelerating, transferring available heat into the airstream, optimizing energy, and harnessing power from this STUT technology is the focus and accomplishment of some of the example embodiments herein.

The Subterranean Updraft Tower-STUT produces emissions-free, base load power by Energy Harvesting the waste heat or cooling cycle heat (not exhaust heat) generated from new or existing thermoelectric power plants; or Solar/Geothermal Heat, or industrial process waste heat resources. Described herein are means and methods of generating clean, reliable power within a combination subgrade or sub-terrestrial downdraft/updraft tower by harvesting process heat, waste heat, or renewable organic heat resources. Unlike thermoelectric power generation systems such as natural gas, coal and nuclear, and Wind/Solar, STUT Power Generation systems can be established in almost any location, either off-grid, remotely, centrally located, or distributed with minimum environmental impact. This favorable impact is due to its small footprint and lack of dependence on external fuel supply, or natural resources such as wind, sun, water, etc. STUT can be installed in an array format, making it highly scalable, reliable when deployed in an array used alongside thermoelectric power plants; allowing for the thermoelectric power plants configuration of an emission-free hybrid baseload grid power producer. STUT avoids numerous regulatory restrictions associated with traditional renewable energy production resources, site selection, and operations when deployed as a thermoelectric power plant retrofit.

The advantages and accomplishments of the example embodiments include but are not limited to:

The transition of existing power utility infrastructure to cleaner sustainable power generation technology. STUT is agnostic on source of heat, and thus is perfect for transiting power utility infrastructure away from fossil fuels long-term;

Increased renewable power reliability by providing 100% command and control of mass displacement rates that provides airflow-based power on a 24/7/365 basis at any urban, industrial, or rural location on earth;

Small operational footprint, use of Geothermal or Solar Thermal Resources;

Unaffected by lack of day light, time of day, local weather, or climate conditions;

Provides a consistent controllable, highly reliable source of clean renewable energy;

Relatively low costs of development, construction, and costs of operations, on a Levelized Cost of Electricity, LCOE basis, due to very high operational capacity factors;

No reduction in performance due to operations, lifecycle time, age, environmental or weather conditions, no bug debris, bird strikes, or harm to migratory birds; no flicker or noise pollution;

Very low, to no net environmental impact compared with classic renewable energy technologies and traditional power plants, especially when installed at the site of an existing thermoelectric power plant as a retrofit.

Described herein in an example embodiment of a Sub-Terranean Updraft Tower for generating power. It includes an outer downdraft shaft extending from a downdraft shaft top having a downdraft inlet orifice for air entry to a downdraft shaft bottom, the downdraft shaft top being positioned near grade or above grade and the downdraft shaft bottom extending deep below grade; an inner updraft shaft concentrically located within the outer downdraft shaft, the inner updraft shaft extending from near the downdraft shaft bottom to an elevation higher than the downdraft shaft top and having an updraft inlet orifice in fluid communication with the outer downdraft shaft only at an airflow transition region located near the downdraft shaft bottom; an updraft tower supports an above grade portion of the inner updraft shaft with an updraft outlet orifice at or near a top of the updraft tower and houses a vertical axis vertical airflow wind turbine disposed in the inner updraft shaft, the vertical axis vertical airflow wind turbine configured to generate rotational velocity from moving air in the inner updraft shaft; and a thermal barrier coating on the outer downdraft shaft.

Additionally or alternatively, the STUT tower can have the thermal barrier coating coats most of an outer wall of the outer downdraft shaft. Additionally or alternatively, the thermal barrier coating can be a paint, a ceramic or cermet, or it can have pores of an average size of at least 10 μm and a porosity greater than 10%.

An alternative embodiment of a Sub-Terranean Updraft Tower for generating power is also described herein. It includes an outer downdraft shaft extending from a downdraft shaft top having a downdraft inlet orifice for air entry to a downdraft shaft bottom, the downdraft shaft top being positioned near grade or above grade and the downdraft shaft bottom extending deep below grade; an inner updraft shaft concentrically located within the outer downdraft shaft, the inner updraft shaft extending from near the downdraft shaft bottom to an elevation higher than the downdraft shaft top and having an updraft inlet orifice in fluid communication with the outer downdraft shaft only at an airflow transition region located near the downdraft shaft bottom; an updraft tower supports an above grade portion of the inner updraft shaft with an updraft outlet orifice at or near a top of the updraft tower and houses a vertical axis vertical airflow wind turbine disposed in the inner updraft shaft, the vertical axis vertical airflow wind turbine configured to generate rotational velocity from moving air in the inner updraft shaft; and airflow partitions in at least one of the shafts that are physical objects configured to reduce lateral moving air flow and promote coherent air flow.

Additionally or alternatively, the airflow partitions can be located at or near the outer downdraft shaft top, can be moveable to reduce or close off the airflow through the outer downdraft shaft top, and/or can be louvers or dampers. Optionally, the air intake region at the outer downdraft shaft top is flared so that the cross-sectional area is wider at the outer downdraft shaft top than the bottom of the air intake region. The airflow partitions in the air intake region can extend radially from the inner updraft shaft to outer downdraft shaft. Additionally or alternatively, an array of the airflow partitions is disposed radially from the inner updraft shaft to outer downdraft shaft. Optionally, the array extends over a vertical section of the outer downdraft shaft, the section does not extend the entire length of the outer downdraft shaft. Optionally, a second array extends over a vertical section of the outer downdraft shaft, the section does not extend the entire length of the outer downdraft shaft, and at least one vertical length of the shaft between the first array and the second array is free of airflow partitions. Additionally or alternatively, a continuous section of the airflow partitions forms vertical air ducts to facilitate laminar airflow and disposed within the ducts are dampers or louvers configured to control the airflow. Optionally, the airflow partitions can be used to reduce the cross-sectional area of the inner updraft shaft and increase the velocity of the moving air approaching the vertical axis vertical airflow wind turbine. Optionally, the airflow partitions circumferentially segment the outer downdraft shaft to facilitate laminar airflow.

Optionally, the downdraft shaft bottom is a concave surface with respect to a length of the outer downdraft shaft. Additionally or alternatively, the concave surface comprises a protrusion aligned with a center of the inner updraft shaft. Additionally or alternatively, the downdraft shaft bottom is center rippled effect paraboloid shaped cowling. Optionally, the airflow partitions circumferentially segment the outer downdraft shaft at the transition zone to facilitate laminar airflow.

Also described herein is a method of manufacturing a Sub-Terranean Updraft Tower. The method includes the steps of boring out the ground to make a deep sub-terranean bored shaft; inserting an outer downdraft shaft lining into the bored shaft to define an outer wall of an outer downdraft shaft; attaching an air intake frustum to the top of the outer down draft shaft; inserting an inner updraft shaft lining inside of the outer downdraft shaft lining to define an inner wall of the outer downdraft shaft and an outer wall of the inner updraft shaft, the inner updraft shaft lining extended above the air intake frustum with a tower; inserting a vertical axis vertical airflow wind turbine in the inner updraft shaft at a point near or above the air intake frustrum; and adding airflow partitions into at least one of the outer downdraft shaft or the inner updraft shaft.

Optionally, the method includes a step of adding a thermal barrier layer to the outer downdraft shaft lining. Optionally, the method includes a step of adding a center rippled effect paraboloid shaped cowling at the bottom of the outer downdraft shaft in a transition zone where air moving in the outer downdraft shaft can switch direction and move into the inner updraft shaft. Optionally, the method includes a step of adding radially extending airflow partitions from the inner wall to the outer wall of the outer downdraft shaft near the bottom of the outer downdraft shaft in a transition zone where air moving in the outer downdraft shaft can switch direction and move into the inner updraft shaft.

These and other aspects of the present invention will become apparent upon reading the following detailed description in conjunction with the associated drawings. Other features and advantages of the invention will be apparent from the following description, including the figures, and from the claims presented according to the present invention.

BRIEF DESCRIPTION OF DRAWINGS

The accompanying drawings illustrate a number of example embodiments briefly described here:

FIG. 1 is a block diagram of an example embodiment showing STUT sub-terranean updraft tower major functional elements, its links, connections, and resource flows between major internal system elements, and external interfaces;

FIG. 2 is a schematic diagram of the example STUT process relative dynamic system conditions of pressure, temperature, and volume present at ideal control locations within the STUT system during operation;

FIG. 3 is an axonometric view of STUT system;

FIG. 4 is a full section longitudinal view of STUT system, above surface and subsurface elements;

FIG. 5 is an above surface elevation of STUT system elements;

FIG. 6 is a top view of STUT system elements;

FIG. 7 is a longitudinal section view of STUT system elements;

FIG. 8 is an enlarged longitudinal section view of STUT system elements;

FIG. 9 is an enlarged longitudinal section view of upper shaft;

FIG. 10 is a latitudinal section view of nozzle and VAVANT;

FIG. 11 is a latitudinal section view of outer downdraft air intake, inner updraft shaft and nozzle and VAVANT;

FIG. 12 is a latitudinal section view of downdraft shaft/updraft tower; and

FIG. 13 is a longitudinal axonometric section view of STUT system elements.

FIG. 14 is a close-up of a longitudinal axonometric section view of an exemplary transition zone including a Center rippled effect paraboloid shaped Cowling.

FIG. 15 is a zoomed out longitudinal axonometric section view of another exemplary embodiment containing airflow control features containing left section, middle section and right section views that are intended to fit together as depicted.

FIG. 16 is a close-up of a longitudinal axonometric section view of the exemplary STUT air intake including partitions from the left section of FIG. 15.

FIG. 17 is a similar view to that of FIG. 14 that shows the Center rippled effect paraboloid shaped Cowling, but this view also shows example concentric ducting/partitions leading into the transition zone from the outer downdraft shaft.

FIG. 18 is a close-up of one of the example partitioning sections shown in various views of FIG. 15.

REFERENCE NUMERALS IN THE DRAWINGS

8 Air Intake Frustum
9 Intake Partitions 10 outer downdraft shaft
11 outer downdraft shaft air inlets
12 incoming air
13 downward airflow
14 STUT System
15 transit air
16 outer shaft/inner shaft transition or transit zone
17 outer downdraft shaft lining
18 subsurface
20 inner updraft shaft/tower
21 Inner Updraft Shaft Inlet
22 up air flow
23 heat exchanger
24 tower
25 heated up air
26 ground surface level
27 inner updraft shaft lining
28 shaft partitions
29 Center Rippled Effect Paraboloid Shaped Cowling
30 VAVANT airflow nozzle
31 VAVANT airflow turbine
32 Nested Converging-Diverging Semi-Ovular Nozzle (NCDSO)
33 powerhead
34 nested converging—diverging semi-ovular nozzle
37 power/electrical power output
40 upper updraft tower air outlets
41 air discharge vents
42 outgoing airflow
44 Upper Shaft vents and cover
45 upper updraft shaft lining
50 heat
51 power plant harvested heat
52 geothermal hot dry rock
53 solar thermal energy
54 heat resource options
55 injection of air/heat
56 power grid

DETAILED DESCRIPTION OF SPECIFIC EMBODIMENTS OF THE INVENTION

Some of the embodiments herein leverage mechanical advantages and functional synergies derived from laws of physics and engineering principles. The STUT includes a deep Outer Downdraft Shaft 10 in the earth, which houses an Inner Updraft Shaft 20, both shafts extending from at, near or above ground level to subterranean depths. These elements provide the structure that creates the opportunity for the mass displacement of air, to first move or flow downward into the Outer Downdraft Shaft 10, and then upward in the Inner Updraft Shaft 20. The use of a large diameter shaft that is at a lower elevation than surrounding the terrain creates initial thermal sink and cooling of the Outer Downdraft Shaft 10, and a natural or organic relative pressure differential within the STUT System 14, within the Outer Downdraft Shaft 10; as the air inside the shaft, at depth is at a relatively higher pressure than the air that is at ground level, due to the gravity constant.

A plurality of volumetric displacements of air or other gases communicate with other volumetric displacements of air or other gases, are sustained and continuously driven by the plurality of sustained pressure biases within the system. The system pressure differentials are also sustained and enhanced by temperature differentials initiated, sustained, and enhanced based on the orientation and configuration of STUT functional process elements. The STUT process includes an Inner Updraft Shaft 20 vertical air shaft with Vertical Axis Vertical Airflow Nozzle 30 and Turbine assembly, oriented and housed at ground surface level 26, Inner Updraft Shaft 20 is concentrically located within the Outer Downdraft Shaft 10. Once reaching the bottom of the Outer Downdraft Shaft 10, air flow reverses in direction, inward and upward, into the inlet of the Inner Updraft Shaft 20 STUT shaft. STUT airflow is induced and sustained via the injection of air and heat 55 into the optionally contoured Inner Updraft Shaft 20 of the STUT, with the thermal energy transfer/exchange in to the air masses within the Inner Updraft Shaft, the organic pressure gradient is disrupted as a relatively increased and uniform pressure is achieved and manifested throughout the total volume of the Inner Updraft Shaft, creating a relative high pressure region below and upwind of the Vertical Axis Vertical Airflow Nozzle 30 and Turbine, and a low pressure region above and downwind of the Vertical Axis Vertical Airflow Nozzle 30 and Turbine, creating coherent, accelerated airflow, that approaches the contoured Vertical Axis Vertical Airflow Nozzle 30 and Turbine—VAVANT Airflow Turbine 31 with relatively increased pressure and velocity; causing divergent, convergent airflow to pass through and within the contoured nozzle, and across the VAVANT Airflow Turbine 31. The summation of pressure biases in the Outer Downdraft Shaft 10, and Inner Updraft Shaft 20 and VAVANT Airflow Nozzle 30 drives accelerated airflow toward the face of the turbine, causing rotation of the VAVANT Airflow Turbine 31, and the summation of torque forces at VAVANT Airflow Turbine 31 hub and perimeter, attached gearing, and power head 33, thus generating EMF and electrical power.

The processes of initiating, inputting, collecting, controlling, aligning, orienting, conditioning, accelerating, transferring, exchanging, and mixing airflow masses with available heat into the airstream, optimizing exergy, and harnessing converted power from this technology is the focus and accomplishment of some of the embodiments. These and the other main STUT elements provide the following processes related to STUT System 14 Organization and Operations, that support or provide beneficial functions and associated features described herein.

The Sub-Terranean Updraft Tower Process Organization

The STUT System 14 has several functional processes and elements which, according to an example embodiment, including:
  a. Air Resource
  b. Heat Resource
  c. Downdraft Air Inlet 11
  d. Outer Downdraft Sub-Terrestrial Shaft
  e. Inner Updraft Shaft
  f. VAVANT Airflow Turbine
  g. VAVANT Nozzle
  h. Upper Updraft shaft
  i. System Command & Controls The Outer Downdraft Sub-Terrestrial Shaft provides the physical containment and environment for the base and structural foundation of the STUT Tower 24. The Outer Downdraft Shaft Lining 17 is made of concrete, steel, or other rigid impermeable material; shaft depth and diameter are included among the contributors to the power generation capacity factors of the STUT process. Outer Downdraft Shaft Air Inlets 11 Ports & Dampers, control incoming air flow 12 into the Outer Downdraft Shaft 10 are provided by a continuous 360-degree opening of air intake apparatus, located at the upper, above grade perimeter of the Outer Downdraft Shaft 10. The Outer Downdraft Shaft 10 houses an airflow control apparatus including dampers, louvers, openings, screen mesh, etc., and are located at, near, and/or above ground surface level 26. The Outer Downdraft Shaft 10 provides partial geothermal cooling or warming of air entering the shaft and is partially insulated, to mitigate or counter the geothermal temperature gradient's influence, to maintain control of, and sustain, relative air temperatures of air mass flowing into and through the Outer Downdraft Shaft 10, regardless of climate or season. Both functions of Temperature Differentials and Pressure Differentials are initiated within the Outer Downdraft Shaft 10, with a mass of transit air 15 arriving at the Transition Zone 16, located at the bottom of the Outer Downdraft Shaft 10, denser, and of higher pressure than when it entered the Outer Downdraft Shaft 10.

FIG. 14 depicts a close-up view of the cross-section of the STUT at the bottom of FIG. 13, depicting the exemplary embodiment of transition zone 16. In this embodiment, STUT can optionally use structural volume flow control measures in and around the Transition Zone. One such example is a center rippled effect paraboloid shaped cowling 29 at bottom of Outer Downdraft Shaft at the Transition Zone. This Cowling provides a low friction, corner-free surface for the air to exit the outer downdraft shaft 10 and enter the inner updraft shaft inlet 21 at the transition zone in what is approximately a 180° change in direction. In particular, this cowling shape provides a concave curved bottom with an upward projectile in the center so that the air can smoothly flow through the transition zone 16 evenly across the 360° circular cross-section of the outer downdraft shaft 10, the transition zone 17 and then the inner updraft shaft inlet 21. This shape minimizes drag, turbulence, and vibration while maximizing continuous and controlled airflow and efficiency. Other example shapes can be used, such as replacing the concave curve of the cowling with a continuous V-shape interior to the circumference of the cross-section at the transition zone.

The louvers and/or dampers can be electromechanically controlled by, e.g., a motor and cabling system connecting the dampers. Alternatively, each movable component could have its own control system for built-in redundancy in case the main motor fails or another component fairs. Because taking the system offline is expensive in terms of lost profits, it is preferable to be up to make the fixes from outside the STUT when possible.

For example, the motor controlling the louver system can sit proximate to the downdraft shaft top where the air intake occurs. In this way, the motor can be fixed or taken off-line without taking the entire STUT off-line. The louver slats are ideally made of a light weight but strong material so as not to absorb the energy of the air through flexing.

Additionally, by having the ability to control the airflow in the opening at the top of the downdraft shaft, in situations where extreme or unusual airflow is occurring outside of the system, the system can be closed off from such air. In one example, the angle of the sun shines an unfavorable way on the downdraft shaft top that ordinarily would cause the system to reverse flow. Instead, the operator or software can cause the opening of the STUT to close to prevent this reverse flow. This can also be used to protect the system and extreme weather events like tornadoes.

In another example embodiment, vertical partitions at least partially divide or separate the downdraft shaft and/or the updraft shaft. These partitions create laminar airflow to force coherency in the air flow direction and prevent lateral airflow. In some embodiments, these vertical partitions can have individual slats that can effectively shut off the airflow in certain ducts allowing higher speed airflow in other ducts, overall increasing the speed of the system. This can be useful in the lower pressure areas of the system such as to increase the airflow velocity upwind of the turbine. As used herein, partitions include dividers, ducting, baffles, and other physical structures that control airflow.

Additionally or alternatively, the STUT Tower can use a variety of physical airflow mechanisms. STUT uses at least one methodology to control airflow within the STUT system, including Ducting/Partitioning/Dampers/Louvers. Ducting and partitioning of air at the airflow intake, within outer downdraft shaft, and within inner updraft tower are STUT system enhancements that help create and support efficient airflow throughout the STUT system, and especially at crucial locations that are susceptible to stall air, and turbulent airflow. In STUT, gases moving in the shafts can experience decreased efficiency in mass flow rates, and velocities as frictions increase. This can occur at turns, choke points and inlets, which creates vorticities and stale air. Stale air flow is the opposite of laminar or coherent airflow, which is highly efficiency air flow. Even though this system will experience very-low air flow velocities within +95% of the internal shafts, with airflow velocities peaking at VAVANT Turbine, and other possible locations including the outer and inner shaft transition zone. Placing Airflow controls such as ducting, and partitioning at critical locations within the STUT System where stall air is likely to occur aids in efficient air flow at locations within the inner and outer shaft and transition zone. Placing Airflow controls such as dampers and louvers at critical entry and exits locations of the STUT System where negative airflow and stall air is likely to occur aids in steady flow, especially airflow at the air intake and exhaust or outlets, preventing inefficiencies and internal loss of energy and power conversion due to stale air flow.

FIGS. 15 and 16 depict an example embodiment of an air intake frustrum that shaped like an inverted right circular cone to allow for a 360-degree air intake. The air intake frustrum 8 can take other shapes including but not limited to a pyramid (e.g., decagonal or rectangular), column, or a sphere frustrum and at a range of angles. An angled frustrum may be of interest to source air at a location other than straight up or to show preference away from an undesirable air source. This air intake frustrum 8 can be a single piece or multiple pieces. It can be integral to the outer downdraft shaft lining 17 or separate construction. Unless otherwise specified or understood by the context, the air intake frustrum 8 is considered part of the outer downdraft shaft 10. Segmenting or otherwise dividing the interior volume between the air intake frustrum can be intake partitions 9. Each intake partition 9 can be a single piece, multiple pieces, static, movable, and/or partially moveable. For ease of construction or structural stability, an entire array of intake partitions 9 and/or the air intake frustrum 8 can be pre-assembled as a single piece. The intake partitions 9 can function as dampers or louvers, can self-adjust based on the atmospheric changes of the outer downdraft shaft air inlets 11 or solar light availability, or can be adjusted through an external mechanism like a motor. Partitions and Ducting at air Intake increase coherent air flow and reduce stall air.

Additionally or alternatively, an additional fan or fans or an extension of the turbine can be used in the upper outer updraft shaft to facilitate airflow into the air intake frustrum 8. For example, in some situations, such as with an angled air intake frustrum 8, the airflow coming into the outer downdraft shaft air inlets 11 may be inconsistent. An array of microfans hovering near the entrance can locally control the airflow to even out the different constituent flows and to help generate coherent airflow. A fan sucking air into the air intake and blowing air into the STUT can also act like preloading a siphon to make ongoing flows easier when unaided. A downstream fan can push air through or expel air from the STUT to have a similar benefit.

In one example embodiment, the airflow partitions can be located along the length of the entire outer downdraft shaft and/or inner updraft shaft. In an alternative example embodiment, the airflow partitions the several intermittent locations in the outer downdraft shaft, e.g., 2-3 sections of segmented 360-Degree concentric ducting in the outer downdraft shaft 10. These intermittent concentric bundles or segments have breaks in the partitions to allow air mixing and reduce friction. FIG. 18 depicts a close up of an example embodiment of one of these intermittent sections. The shaft partitions 28 are shown as if peering from outside a transparent outer downdraft shaft, with the shaft partitions being located between the two shafts.

FIG. 17 depicts an example embodiment similar to that of FIG. 14, but additionally illustrating airflow partitions upstream and leading into the transition zone. In this embodiment, enhancing the transition zone with the addition of optional intermittent airflow partition locations in the outer and inner shafts can improve performance. Concentric bundles or segments, with breaks to allow air mixing and reduce friction.

Claim—of use of Ducting/Partitioning/Dampers/Louvers appropriate existing, and potentially newly developed materials, techniques, and technologies to control airflow within the STUT internal environment In some example embodiments, the combination Center Rippled Effect Paraboloid Shaped Cowling and Concentric Ducting/Partitions are configured and shaped to form a continuous control of airflow direction change with non-turbulent laminar flow. This single concentric bundle or segment of ducted partitions in conjunction with the Center Rippled Effect Paraboloid Shaped Cowling provides and supports the 180 Degree change in airflow direction from the outer downdraft shaft into the inner updraft shaft. This provides continuous and controlled airflow at maximum efficiency in the transition zone, reducing turbulence and vibration.

STUT can make use of appropriate existing, and potentially newly developed materials, techniques, and technologies to control thermal energy within the STUT internal and external environment. At least one mechanism can be employed to controlling the thermal and pressure characteristics of the internal environment. An example embodiment includes the use of thermal barrier on at least some surfaces. A thermal barrier can take the form of a coating or a base material with a high R-value. Optionally or alternatively, in some embodiments, the thermal barrier coating can have porosity. An example embodiment has at least 10 µm average pore size and at least 10% porosity. Another example uses powder coating technologies. Another example uses a painted-on coating of Applicants partitions and ducting can itself have a high R-value, or a thermal barrier coating can be added to such surfaces. The outermost surfaces on the outer downdraft shaft 10 are an effective location to remove uncontrolled temperature variation. Most external and internal surfaces can benefit from preventing thermal conductivity such as the inner updraft shaft lining 27 and outer downdraft shaft lining 17. The thermal barrier coating can be anything from a thin film to a layer of paint to a thicker layer of material to a multilayered system. The coatings can be deposited by any known or future arising method, including but not limited to painting, spray deposition, vapor deposition and epitaxial formation. In example embodiments, the coatings can be first applied before construction of the STUT or after construction in situ. The coating should either be durable or something that can be reapplied or refreshed during STUT tower maintenance operations. Coating materials should be selected that can withstand the elements and conditions of the tower. Even though some coating methods have a much higher unit cost, the unit cost economics offset by the energy savings will be reimbursed over time. One such example is a sprayed-on Thermacote® thermal barrier coating paint. Another example are thermal barrier coatings used in turbine and aerospace applications. In some example embodiments, the thermal barrier coating on metal is part of a multilayer system comprising a metallic bond coat, a thermally grown oxide and the thermal barrier on top. The thermal barrier coating, in effect, prevents uncontrolled thermal energy transmission and thermal energy migration and flow across the shaft-ground interface and from within and across the STUT structural materials. Controlling and thermally isolating the internal environment provides the ability to accurately measure and control the amount of thermal energy and pressure within the STUT system. The use of a plurality of materials and techniques is intended to prevent uncontrolled thermal energy transmission, prevent thermal energy migration and flow across and within STUT structural materials, and prevents thermal leakage into and out of the system.

The Inner Updraft Shaft lining 27 provides containment, mixing, and transfer of the conditioned airflow mass received from the Transition Airflow 15 Zone 16, at the bottom of the Outer Downdraft Shaft 10. It contains the Heat Exchanger 23 function and VAVANT Airflow Nozzle 30 and Turbine 31 and is housed or located within the Outer Downdraft Shaft 10. The Inner Updraft Shaft 20 is a cowling, made of a strong, lightweight, impermeable material that partitions the Outer Downdraft Shaft 10 zone, and Inner Updraft Shaft 20 zone within the subsurface 18 regions of the system. The Inner Updraft Shaft 20 is a hollowed, truncated cone, or vertically oriented hollow conical frustum, with flared end downward, and tapered end upward, decreasing in diameter as the Inner Updraft Shaft 20 rises, approaching the VAVANT Airflow Turbine 31 orifice. This orientation constrains air flow velocity, slightly decreasing air volume, while increasing pressure within the Inner Updraft Shaft 20, and the overall system pressure differentials.

As air approaches the VAVANT Airflow Turbine 31 orifice, it is at a pressure relatively higher than the ambient air pressure external to the system, or that is in the Outer Downdraft Shaft 10, or air in the Upper Updraft shaft 20 located above and downwind of the VAVANT Airflow Turbine 31 orifice. The VAVANT Airflow Nozzle 30 is part of the Inner Updraft Shaft 20 and functions to divert or spread, producing a 360-degree diversion of the vertical airflow stream, which is created within the Inner Updraft Shaft 20, into the VAVANT Airflow Turbine 31 inlets. The VAVANT Airflow Nozzle 30 has decreased the cross-sectional area of air flow, which increases the relative pressure, flow rate as the diverted, diverged air approaches the VAVANT Airflow Turbine 31 orifice. This VAVANT Airflow Turbine 31 orifice is a ring configuration, similar to the preferred, outer ring of performance within the outer edges, or radius of a typical Horizontal Axis Wind Turbine-HAWT Swept Area; not the less preferred single center opening that directs airflow onto turbine blades that occupy the center, lowest performing regions of a typical Horizontal Axis Wind Turbine-HAWT Swept Area. Besides air, heat is an additional primary energy input into the STUT System 14. Heat 50 is brought into the system via heat exchangers 23 and working fluid from Heat Resources Options 54, derived from a plurality of heat resources, into the Inner Updraft Shaft 20. Achieving the previously described Outer Ring of Performance forms the basis of the function and orientation of the VAVANT Airflow Nozzle and Turbine, and supporting combination Downdraft/Updraft Tower of the STUT process.

The VAVANT Airflow Turbine 31 makes use of the Upward Air Flow and associated mass flow rate generated within the Inner Updraft Shaft 20. The STUT uses an air flow turbine seated at the apex of the Nested Converging-Diverging Semi-Ovular Nozzle 32 orifice and harnesses energy from the Heated-Up Airflow 25 moving through the Inner Updraft Shaft 20 and VAVANT Airflow Nozzle orifice. VAVANT Airflow Nozzle 30 and Turbine 31 is made of light weight, high strength, durable materials that are connect via center located power shaft and mechanical gearbox. In an alternative configuration multiple power heads 33 are located at the perimeter of the VAVANT Airflow Turbine 31 Outer Ring, via mechanical power shaft apparatus. A plurality of VAVANT Airflow Turbine 31 related mechanical, electrical, electronic control, monitoring, and mechanisms are housed within the VAVANT Airflow Nozzle 30 to harness the airflow energy efficiently and reliably, and its conversion to mechanical, and electrical power output 37.

With STUT, a large and deep shaft of air will have greater mass and significantly higher relative air pressure than that at ground level. In an example embodiment, the relationship of the Inner Updraft Shaft 20 and Outer Downdraft Shaft 10 is unique and significant because the shafts' configuration creates a constant taper effect of air volume as the air approaches the VAVANT Airflow Nozzle 30 and Turbine 31. This orientation creates a continuous decrease of the cross-sectional area as the air moves downward in the Outer Downdraft Shaft 10 and then upward within the Inner Updraft Shaft 20. The outer shaft is a true cylinder while the Inner Updraft Shaft 20 is a truncated cone, or conical frustum, with the taper down or decreasing diameter end closest to the VAVANT Airflow Nozzle 30 and Turbine 31. In this case, as air crosses the turbine and enters the Upper Updraft shaft 20, it slows dramatically. STUT enhances this natural stack effect by injecting heat the Upper Updraft shaft 20. This higher temperature, compared to the air temperature of the Inner Updraft Shaft 20, creates a pressure and volume difference. As the air approaches the exit opening or nozzle of the Inner Updraft Shaft 20, and crosses the VAVANT Airflow Turbine 31 orifice, the Venturi effect, caused by the orientation and configuration of the Nested Converging-Diverging Semi-Ovular Nozzle 30, causes mass flow rates and air velocity to increase, dramatically, at the ringed orifice.

The VAVANT Airflow Nozzle 30 and Turbine 31 orifice of this System is not a single center hole that passes air in a single center-lined air stream. Instead, it can be a shaped, contoured orifice created by the use of a combination flared valve nozzle, that produces a ring-shaped air flow configuration that passes high-speed air, at flow rates sufficient to the spin turbine. The actions or functions of the enhanced pressure differential across the orifice; per the Combined Gas Law, the achieved, pressure bias of the Upper Updraft shaft 20 and the Inner Updraft Shaft 20; Airflow, Volume displacement, and/or mass flow rates are directly proportional to the input/output ratio of the VAVANT Airflow Nozzle 30 and Turbine 31 orifice. This orientation decreases air volume. However the system experiences a significant increase in airspeed, according to the Bernoulli Equation. The Bernoulli Equation and Venturi Effect teaches that increased velocity is achieved at the choke point or apex of constrained fluid flow; the resultant pressure drop associated with deceleration of mass displacement across turbine blades. The VAVANT Airflow Nozzle 30 provides the function of constraining mass flow, increasing pressure and accelerating velocity and mass flow rates through the nozzle and across the VAVANT Airflow Turbine 31. The narrowing, diverging and converging of the orifice creates an orifice ring, harnesses the outer radius of Swept Area, and creates a performance ring that, unlike HAWT, that are designed across a range of air velocities, performs at a specific, controlled, tuned, optimized extremely high mass flow rate. The ideal system conditions leverage the variables of Pressure, Temperature, and Volume to create maximum pressure bias at the apex of the VAVANT Airflow Turbine 31, in accordance with the combined gas law; with the zone just above and downstream of the orifice possessing the lowest relative pressure within the system. The Upper Updraft shaft 20 also provide for system air discharge and holds the STUT Air Discharge vents 41, louvers and covers which protects the system from debris and prevents foreign items from falling in the STUT from above. Establishing and sustaining a plurality of STUT System 14 pressure biases, creates, and sustains high mass flow rates; which are included among the key contributors to the power generation capacity factors of the STUT System 14.

The designed diameter ringed orifice, nested VAVANT Airflow Nozzle configuration, and its cross-sectional area are included among the contributors to the power generation capacity factors of the STUT System 14; providing mass flow rates sufficient to create torque equal to larger traditional HAWT. STUT is a VAVANT Airflow Turbine 31, which creates, controls, and uses this High RPM, medium torque device to produce electrical power equal to HAWT, more efficiently in a smaller footprint.

The Upper Updraft Shaft's 20 specific function characteristics and profile are derived from the downwind airflow dispersion of the Beltz Ratio Flow Rate relation schematic, sourced from Sustainable Energy, (Tester, Drake, etc.). Within the STUT System 14, this updraft downwind zone of reduced airflow rate and low-pressure zone must be accounted for to reduce back pressure and turbine blade wake turbulence. The Upper Updraft Tower provides the crucial element of, and dimension for downwind air disbursement needed in any wind turbine, but especially with a non-organic wind turbine with STUT unique orientation. The Upper Updraft Shaft Lining 45 is a cowling, made of strong, lightweight, impermeable material that evacuates system air from STUT downwind chamber. Additionally, the Upper Updraft shaft 20 enhances overall system pressure differential but providing communication of relatively high-pressure air mass with relatively low-pressure air mass, across the VAVANT Airflow Nozzle 30 and Turbine 31 orifice. The height and volume of the Upper Updraft Shaft 20 are included among the contributors to the power generation capacity factors of the STUT System 14. The Upper Shaft Vents system airflow and Covers 44 the STUT components.

As stated, a primary Heat Resource Option 54 for STUT in a Thermo-Electric Power Plant Hybrid configuration, is Power Plant waste heat 51. In some embodiments, the preferred configuration is a full STUT, a non-hybrid configuration wherein Heat Resources 50 of Geothermal 52 Hot Dry Rock—HDR wells or Solar Thermal 53 Heat are utilized to provide fully renewable and emissions-free power generation to the Power Grid 56.

Operations of the Sub-Terranean Updraft Tower System

In some embodiments, a combination Downdraft/Updraft Tower airflow processes generates electrical power from the large volumetric displacements of air or other gases; driven by a plurality of sustained system pressure biases, and fed by temperature differentials initiated, sustained, and enhanced due of the configuration and orientations of the functions of numerous STUT process elements. The STUT process includes an Inner Updraft Shaft 20 vertical air shaft with nested Vertical Axis Vertical Airflow Nozzle and Turbine—VAVANT Airflow Turbine 31 assembly. The Inner Updraft Shaft 20 is oriented and housed within a deep, sub-terrestrial Outer Downdraft Shaft 10 which receives low-velocity downdraft air flow 13 from STUT System 14 Outer Downdraft Shaft 10 air inlets located at or near ground surface level 26; with airflow downward into a deep Outer Downdraft Shaft 10.

Once reaching the bottom of the Outer Downdraft Shaft 10, air flow reverses in direction, inward and upward, into the Inner Updraft Shaft Inlet 21 of the Inner Updraft Shaft 20 of the STUT. The STUT Up Air Flow 22 is induced and sustained via the injection of air into the Outer Downdraft Shaft 10, and heat into the contoured Inner Updraft Shaft 20 of the STUT, which creates a coherent and accelerated airflow; and approaches the contoured Vertical Axis Vertical Airflow Nozzle and Turbine—VAVANT Airflow Turbine 31 with relatively increased pressure and velocity; causing divergent converged airflow to pass through and within the contoured nozzle, and across the VAVANT Airflow Turbine 31 with high velocity and mass flow rate. The accelerated airflow causes rotation of the VAVANT Airflow Turbine 31, and the summation of torque forces present at the VAVANT Airflow Turbine 31 center hub and perimeter; within the attached gearing and power head 33; thus generating EMF and electrical power. The processes of initiating, inputting, gathering, collecting, controlling, aligning, orienting, conditioning, accelerating, transferring, exchanging, and mixing airflow mass with available heat into the airstream, optimizing exergy, and harnessing converted power from this technology is an accomplishment of some of the example embodiments. These and other major elements STUT provide the following processes related to STUT System 14 Organization and Operations, that support or provide beneficial functions and associated features described herein, according to the present invention.

STUT uses a larger diameter Outer Downdraft Shaft 10 to house and enclose a smaller diameter STUT Inner Updraft Shaft 20. STUT's unique design, utility, & orientation creates a combination Outer Downdraft Shaft 10/Inner Updraft Shaft 20 that cools & conditions a continuously descending air mass, creates a relatively lower temp, less buoyant air mass inside a subsurface 18 Outer Downdraft Shaft 10; and a higher temp, relatively more buoyant air mass inside a subsurface 18 Updraft Shaft/Tower 20. STUT uses the relatively large pressure differential between the surface and bottom of a deep shaft to charge the cooled air mass. STUT uses an Inner Updraft Tower/Outer Downdraft Shaft 10 transition to transfer downdraft airflow up and into STUT's—Inner Updraft Tower; where the pressure differentials between the bottom of a deep STUT shaft/tower, and top of Upper Shaft 40 are optimized. The Upper Shaft 40 outlet vents 41 are located above ground surface, and at higher elevation/s than the Outer Downdraft Shaft 10 air inlet elevation/s and provides exit ports for outgoing air flow 42. This elevation or height delta between the bottom of Inner Updraft Shaft 20 and the top of Upper Updraft shaft 20 creates substantial pressure bias enhanced by the transfer or injection of heat 55 from Heat Resources 50, to locations within the inside of the Inner Updraft Shaft 20. With this established and sustained pressure bias, the relatively buoyant air mass of relatively higher pressure and temperature continuously moves into the low-pressure zone within the upper shaft 40 with high velocity and mass flow rate. The air mass of relatively higher pressure and velocity steadily moves across the VAVANT Airflow Turbine 31, after accelerating and crossing or passing through the apex 32 of a Nested Converging-Diverging Semi-Ovular Nozzle 32 (NCDSO), which is housed within the VAVANT Airflow Turbine 31 assembly.

STUT leverages the interdependence of the Pressure, Volume, and Temperature variables under the guidance of the Combined Gas Law, which states that: "The ratio between the pressure-volume product and the temperature of a system remains or attempts to remain constant." This law as stated is interpreted to say that with the existence of an imbalance of any one of the pressure, volume or temperature variables, one of the other variables will seek to re-establish a constant state of balance or equilibrium. STUT's processes and orientations of elements creates a configuration, containment, and environment of system conditions that establish and maintain system-wide pressure imbalances. between neutral pressure system locations, higher pressure system locations, and lower pressure system locations. Additionally, heat is introduced into the Inner Updraft Shaft 20 at depth and drives the STUT System 14 Temperature differential into increased imbalance, creating a plurality of increased biases in Pressure and/or Volumetric displacement of air present in the system between Inner Updraft Shaft 20, Outer Downdraft Shaft 10, and Upper Updraft shaft 20. The high-rate mass flow of air is harnessed by the VAVANT Airflow Turbine 31, as it attempts to reestablish ideal ratios and system balance. Sustaining this imbalance through the configuration and orientations of the functions of numerous STUT process elements creates controlled, stable, high volume, air flow displacement across STUT's VAVANT Airflow Turbine 31, to be harnessed as electrical power.

The Combined Gas Law is an amalgamation of three previously discovered and related laws: Charles's law, Boyle's law, and Gay-Lussac's law. These laws each relate one thermodynamic variable to another mathematically while holding everything else constant. Charles's Law states that volume and temperature are directly proportional to each other if pressure is kept constant. Boyle's law asserts that pressure and volume are inversely proportional to each other at fixed temperature. Finally, Gay-Lussac's law introduces a direct proportionality between temperature and pressure if it is at a constant volume. The inter-dependence of these variables is shown in the combined gas law, which clearly states that:

$$\frac{pV}{T} = k$$

"The ratio between the pressure-volume product and the temperature of a system remains constant." This can be mathematically stated as, where:
p=pressure
V=volume
T=temperature
k is a constant (with units of energy divided by temperature).

Therefore $$\frac{p_1 V_1}{T_1} = \frac{p_2 V_2}{T_2}$$

Within the STUT System 14, the plurality of Pressure, Volume, and Temperature combination variations and lack of equilibrium, once established within and throughout the system, feeds a continuous and sustained plurality of Pressure=p, Temperature=T, and Volume=V, or PVT non-equilibrium conditions. The Combined Gas Law equation chain, therefore, has a plurality of variable condition states as applied with STUT process, and therefore has applicability, continuity, and persistence throughout the STUT System 14.

Comparing and/or seeking an equilibrium state with the performance of air under two or three different sets of conditions, or a plurality of system conditions and locations within the STUT System 14; the combined gas law, within a system with a plurality of locations and large volumetric conditions, can be extrapolated and or reinterpreted for a plurality of example STUT System 14 conditions and locations; example L1, L2, L3, L4, etc., each with associated key variables of Pressure, Temperature, and Volume functions, expressed in FIG. 2 to be written as:

$$\frac{p1V1}{T1} = \frac{p2V2}{T2} = \frac{p3V3}{T3} = \frac{p4V4}{T4} = \text{etc.}$$

According to some embodiments, system elements and functions create conditions; wherein stability or equilibrium are sought but never achieved. A plurality of dynamic imbalance within the STUT System 14 induces and sustains communication of volumetric forces present within air masses at Locations L1 to L2, at L2 to L3, at L3 to L4, and so on, and so forth. An example of the plurality of relative system conditions is thus:

L1. Surface Location 11, 26
  $P_1$— Neutral Relative Pressure
  $V_1$—Low Mass Displacements & Flow Rates
  $T_1$—Neutral Air Temperature
L2. Outer Downdraft Sub 13, 15
  $P_2$— Higher Relative Pressure
  $V_2$— Moderate Mass Displacement & Flow Rates
  $T_2$—Lower Relative Air Temperature
L3. Inner Updraft Shaft 25, 30
  $P_3$— Highest Relative Pressure
  $V_3$— Highest Mass Displacement & Flow Rates
  $T_3$—Highest Relative Air Temperature
L4. Upper Updraft Shaft 31, 42
  $P_4$— Lowest Relative Pressure
  $V_4$— Low Mass Displacement & Flow Rates
  $T_4$—High Relative Air Temperature To build a Sub-Terranean Updraft Tower, an example method has multiple steps. Creating a deep sub-terranean well shaft for the STUT can be done by boring out the ground. Into this well shaft, an outer downdraft shaft lining can be inserted or built into the bored shaft to define an outer wall of an outer downdraft shaft. Optionally, an air intake frustum can be attached to the top of the outer down draft shaft. Optionally, within the air intake frustum, intake partitions can be added. Additionally, partitions can be added at the transition area, throughout or intermittently in the outer downdraft shaft. Inside the outer downdraft shaft, an inner updraft shaft lining is placed or constructed inside with the inner updraft shaft lining extended above the air intake frustum with a tower. Inside the inner updraft shaft, a vertical axis vertical airflow wind turbine is inserted. The features described above can be optionally added such as a choke point as well as additional airflow partitions. Optionally, a thermal barrier layer to the outer downdraft shaft lining, the inner updraft shaft, the tower, or elsewhere. This addition can be done before, during or after construction. A center rippled effect paraboloid shaped cowling, or one of another shape, can optionally be added at the bottom of the outer downdraft shaft in a transition zone where air moving in the outer downdraft shaft can switch direction and move into the inner updraft shaft. Radially extending airflow partitions from the inner wall to the outer wall of the outer downdraft shaft can be added near the bottom of the outer downdraft shaft in a transition zone where air moving in the outer downdraft shaft can switch direction and move into the inner updraft shaft, wherein the airflow partitions circumferentially segment the outer downdraft shaft to facilitate laminar airflow.

Once given the above disclosure, many features, modifications, and improvements will become apparent to the skilled artisan. Such other features, modifications, and improvements are therefore considered a part of this invention, the scope of which is to be determined by these processes. The features, functions, configurations, and orientations of STUT elements described, along with other aspects of the present invention will become apparent upon reading the detailed description in conjunction with the associated drawings. In general, the invention leverages mechanical, thermal, environmental, and electrical advantages and functional synergies derived from a combination of engineering principles. Other features and advantages of the invention will be apparent from the following description, the figures, and from the claims. While the aforementioned is a completed description of the embodiment of the invention, it should be evident that various modifications, alterations, alternatives, and equivalents may be made and used. Accordingly, the above description should not be taken as limiting the scope of the invention, which is defined by the metes and bounds of the appended claims.

Unless otherwise defined, all technical and scientific terms used herein have the same meaning as commonly understood by one of ordinary skill in the art to which the claims features belong. Moreover, Applicants inconsistent use of a term should not be construed as different terms unless defined by Applicant or the context. Although methods and materials similar to or equivalent to those described herein can be used in the manufacturing and use of the example embodiments, suitable methods and materials are described above. All publications, patent applications, patents, and other references mentioned herein are incorporated by reference in their entirety to the extent allowed by applicable law and regulations. The example embodiments may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Other objects and advantages of the various embodiments of the example embodiments will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

Any headings are not intended to be construed as limiting of the subject matter that follows, or the soul place where subject matter under the heading is discussed.

There has thus been outlined, rather broadly, some of the features of the STUT tower and methods herein in order that the detailed description thereof may be better understood, and in order that the present contribution to the art may be better appreciated.

It will be apparent to those skilled in the art that various modifications and variation can be made to the disclosed methods, systems, software, hardware, materials, and components herein. Other embodiments will be apparent to those skilled in the art from consideration of the specification and practice of the disclosed inventions. Numerous modifications, changes, variations, substitutions, and equivalents will occur to those skilled in the art without departing from the spirit and scope of claimed invention. It is intended that the specification and examples be considered as exemplary only, with a true scope being indicated by the claims, as later amended, and their equivalents. The benefits, advantages, solutions to problems, and any element(s) that may cause any benefit, advantage, or solution to occur or become more pronounced are not to be construed as a critical, required, or essential features or elements of any or all the claim, unless asserted as such by Applicant's remarks in the record. Accordingly, the specification and figures are to be regarded in an illustrative rather than a restrictive sense, and all such modifications are intended to be included within the scope of the claimed invention. Likewise, it is to be understood that the phraseology and terminology employed herein are for the purpose of the description and should not be regarded as limiting.

Regarding additional interpretation and construction of terms and steps herein, method steps are not in any specified order unless dictated by the context or specific wording. In addition, a use of a word in the singular form should be interpreted where the context allows, or does not restrict, so as to enable plurality or an "at least one" construction. Positional and directional terms described in this specification may be understood to be different than shown or described, and should not limit the variations of embodiments possible from the claimed features that a person of ordinary skill in the art would understand from the specification, figures, and claims. The term "and/or" in a list means all list items present, some list items present, or one of the list items present, unless such construction is limited by the context. The term "including" means "including, but not limited to." The term "grade" means the level of the uppermost layer of the ground. The term "concentric" means within a given plane an inner tube disposed within an outer tube with no requirement that that inner tube be centered without the outer tube—it does not speak to a similar arrangement outside of the given plane. The terms "upstream" and "upwind" are synonymous with each other, as our "downstream" and "downwind" with each other.

INDUSTRIAL APPLICABILITY

In addition to the goals stated above, the system, apparatuses and methods herein can be used to build geothermal power generation systems.

The invention claimed is:

1. A Sub-Terranean Updraft Tower for generating power, comprising:
    an outer downdraft shaft extending from a downdraft shaft top having a downdraft inlet orifice for air entry to a downdraft shaft bottom, the downdraft shaft top being positioned near grade or above grade and the downdraft shaft bottom extending deep below grade;
    an inner updraft shaft concentrically located within the outer downdraft shaft, the inner updraft shaft extending from near the downdraft shaft bottom to an elevation higher than the downdraft shaft top and having an updraft inlet orifice in fluid communication with the outer downdraft shaft only at an airflow transition region located near the downdraft shaft bottom;
    an updraft tower supporting an above grade portion of the inner updraft shaft with an updraft outlet orifice at or near a top of the updraft tower and houses a vertical axis vertical airflow wind turbine disposed in the inner updraft shaft, the vertical axis vertical airflow wind turbine configured to generate rotational velocity from moving air in the inner updraft shaft; and
    a thermal barrier coating on the outer downdraft shaft.

2. The Sub-Terranean Updraft Tower for generating power according to claim 1, wherein the thermal barrier coating coats most of an outer wall of the outer downdraft shaft.

3. The Sub-Terranean Updraft Tower for generating power according to claim 1, wherein the thermal barrier coating is a paint.

4. The Sub-Terranean Updraft Tower for generating power according to claim 1, wherein the thermal barrier coating is a ceramic or cermet.

5. The Sub-Terranean Updraft Tower for generating power according to claim 1, wherein the thermal barrier coating has pores of an average size of at least 10 μm and a porosity greater than 10%.

6. A Sub-Terranean Updraft Tower for generating power, comprising:
    an outer downdraft shaft extending from a downdraft shaft top having a downdraft inlet orifice for air entry to a downdraft shaft bottom, the downdraft shaft top being positioned near grade or above grade and the downdraft shaft bottom extending deep below grade;
    an inner updraft shaft concentrically located within the outer downdraft shaft, the inner updraft shaft extending from near the downdraft shaft bottom to an elevation higher than the downdraft shaft top and having an updraft inlet orifice in fluid communication with the outer downdraft shaft only at an airflow transition region located near the downdraft shaft bottom;
    an updraft tower supporting an above grade portion of the inner updraft shaft with an updraft outlet orifice at or near a top of the updraft tower and houses a vertical axis vertical airflow wind turbine disposed in the inner updraft shaft, the vertical axis vertical airflow wind turbine configured to generate rotational velocity from moving air in the inner updraft shaft; and
    airflow partitions in at least one of the shafts that are physical objects configured to reduce lateral moving air flow and promote coherent air flow.

7. The Sub-Terranean Updraft Tower for generating power according to claim 6, wherein the airflow partitions are located at or near the outer downdraft shaft top.

8. The Sub-Terranean Updraft Tower for generating power according to claim 7, wherein the airflow partitions are moveable to reduce or close off the airflow through the outer downdraft shaft top.

9. The Sub-Terranean Updraft Tower for generating power according to claim 8, wherein the airflow partitions are louvers or dampers.

10. The Sub-Terranean Updraft Tower for generating power according to claim 8, wherein additional airflow partitions circumferentially segment the outer downdraft shaft at the transition zone to facilitate laminar or coherent airflow.

11. The Sub-Terranean Updraft Tower for generating power according to claim 8, wherein arrays of other additional airflow partitions disposed intermittently within the inner updraft shaft are arranged in concentric bundles or segments.

12. The Sub-Terranean Updraft Tower for generating power according to claim 9, wherein the airflow partitions are used to reduce the cross-sectional area of the inner updraft shaft and increase the velocity of the moving air approaching the vertical axis vertical airflow wind turbine.

13. The Sub-Terranean Updraft Tower for generating power according to claim 7, wherein an air intake region at the outer downdraft shaft top is flared so that the cross-sectional area is wider at the outer downdraft shaft top than the bottom of the air intake region.

14. The Sub-Terranean Updraft Tower for generating power according to claim 13, wherein the airflow partitions in the air intake region extend radially from the inner updraft shaft to outer downdraft shaft.

15. The Sub-Terranean Updraft Tower for generating power according to claim 6, wherein an array of the airflow partitions is disposed radially from the inner updraft shaft to outer downdraft shaft.

16. The Sub-Terranean Updraft Tower for generating power according to claim 15, wherein the array extends over a vertical section of the outer downdraft shaft, the section does not extend the entire length of the outer downdraft shaft.

17. The Sub-Terranean Updraft Tower for generating power according to claim 16, wherein a second array extends over a vertical section of the outer downdraft shaft, the section does not extend the entire length of the outer downdraft shaft, and at least one vertical length of the shaft between the first array and the second array is free of airflow partitions.

18. The Sub-Terranean Updraft Tower for generating power according to claim 6, wherein a continuous section of the airflow partitions forms vertical air ducts to facilitate laminar airflow and disposed within the ducts are dampers or louvers configured to control the airflow.

19. The Sub-Terranean Updraft Tower for generating power according to claim 6, wherein the airflow partitions circumferentially segment the outer downdraft shaft to facilitate laminar airflow.

20. The Sub-Terranean Updraft Tower for generating power according to claim 6, wherein the downdraft shaft bottom is a concave surface with respect to a length of the outer downdraft shaft.

21. The Sub-Terranean Updraft Tower for generating power according to claim 20, wherein the concave surface comprises a protrusion aligned with a center of the inner updraft shaft.

22. The Sub-Terranean Updraft Tower for generating power according to claim 21, wherein the airflow partitions circumferentially segment the outer downdraft shaft at the transition zone to facilitate laminar airflow.

23. The Sub-Terranean Updraft Tower for generating power according to claim 6, wherein downdraft shaft bottom is a center rippled effect paraboloid shaped cowling.

24. The Sub-Terranean Updraft Tower for generating power according to claim 6, wherein the airflow partitions are at least one of dividers, ducting, and baffles.

25. The Sub-Terranean Updraft Tower for generating power according to claim 6, wherein arrays of the airflow partitions disposed intermittently within the inner updraft shaft.

26. The Sub-Terranean Updraft Tower for generating power according to claim 25, wherein each array of the airflow partitions disposed intermittently are arranged in concentric bundles or segments.

27. The Sub-Terranean Updraft Tower for generating power according to claim 26, wherein enough distance exists in breaks between each array of the airflow partitions disposed intermittently to allow for air mixing and reduce friction.

28. A method of manufacturing a Sub-Terranean Updraft Tower, the method comprising the steps of:
   boring out the ground to make a deep sub-terranean bored shaft;
   inserting an outer downdraft shaft lining into the bored shaft to define an outer wall of an outer downdraft shaft;
   attaching an air intake frustum to the top of the outer down draft shaft;
   inserting an inner updraft shaft lining inside of the outer downdraft shaft lining to define an inner wall of the outer downdraft shaft and an outer wall of the inner updraft shaft, the inner updraft shaft lining extended above the air intake frustum with a tower;
   inserting a vertical axis vertical airflow wind turbine in the inner updraft shaft at a point near or above the air intake frustum; and
   adding airflow partitions into at least one of the outer downdraft shaft or the inner updraft shaft.

29. The method of claim 28, further comprising a step of adding a thermal barrier layer to the outer downdraft shaft lining.

30. The method of claim 28, further comprising a step of adding a center rippled effect paraboloid shaped cowling at the bottom of the outer downdraft shaft in a transition zone where air moving in the outer downdraft shaft can switch direction and move into the inner updraft shaft.

31. The method of claim 28, further comprising a step of adding radially extending airflow partitions from the inner wall to the outer wall of the outer downdraft shaft near the bottom of the outer downdraft shaft in a transition zone where air moving in the outer downdraft shaft can switch direction and move into the inner updraft shaft.

32. The method of claim 28, further comprising a step of adding at least one set of airflow partitions inside the inner updraft shaft to reduce the cross-sectional area of the inner updraft shaft and increase the velocity of the moving air approaching the vertical axis vertical airflow wind turbine.

* * * * *